(12) United States Patent
Ohta et al.

(10) Patent No.: US 9,326,287 B2
(45) Date of Patent: Apr. 26, 2016

(54) RADIO COMMUNICATION SYSTEM, BASE STATION, RELAY STATION, AND RADIO COMMUNICATION METHOD

(71) Applicant: FUJITSU LIMITED, Kawasaki-shi, Kanagawa (JP)

(72) Inventors: Yoshiaki Ohta, Kawasaki (JP); Yoshihiro Kawasaki, Kawasaki (JP); Kazuhisa Obuchi, Kawasaki (JP); Yoshiharu Tajima, Kawasaki (JP); Yoshinori Tanaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/793,110

(22) Filed: Jul. 7, 2015

(65) Prior Publication Data

US 2015/0312909 A1    Oct. 29, 2015

Related U.S. Application Data

(63) Continuation of application No. 13/753,176, filed on Jan. 29, 2013, now Pat. No. 9,113,466, which is a continuation of application No. PCT/JP2010/063748, filed on Aug. 13, 2010.

(51) Int. Cl.
*H04W 72/04* (2009.01)
*H04W 74/00* (2009.01)
*H04B 7/155* (2006.01)
*H04W 88/04* (2009.01)

(52) U.S. Cl.
CPC ....... *H04W 72/0446* (2013.01); *H04B 7/15528* (2013.01); *H04W 74/002* (2013.01); *H04B 7/15564* (2013.01); *H04W 88/04* (2013.01)

(58) Field of Classification Search
CPC ............ H04W 72/0446; H04W 88/04; H04W 74/002; H04B 7/15564
See application file for complete search history.

(56) References Cited

U.S. PATENT DOCUMENTS

| 2010/0167768 | A1* | 7/2010 | Tsutsui | H04B 7/15542 455/500 |
|---|---|---|---|---|
| 2010/0272009 | A1* | 10/2010 | Cheng | H04W 52/346 370/315 |
| 2011/0170475 | A1* | 7/2011 | Raaf | H04B 7/15542 370/315 |

(Continued)

FOREIGN PATENT DOCUMENTS

CN    101764644 A    6/2010

OTHER PUBLICATIONS

Mitsubishi Electric; "Guard periods and timing for DL backhauling in Type 1 relays"; Agenda item: 6.6.1.1; 3GPP TSG RAN WG1 #60bis meeting; R1-102239; Beijing, China; Apr. 12-16, 2010.

(Continued)

*Primary Examiner* — Ajay Cattungal
(74) *Attorney, Agent, or Firm* — Myers Wolin, LLC

(57) ABSTRACT

A relay station which performs radio communications with a base station and a mobile station, the relay station includes: a receiver configured to receive radio signals from the base station in downlink backhaul subframes, and to limit reception of radio signals from the base station in subframes other than the downlink backhaul subframes; and a controller configured to allow, when performing a random access to the base station, the receiver to receive a message of the random access even in the subframes other than the downlink backhaul subframes.

2 Claims, 30 Drawing Sheets

(56) References Cited

U.S. PATENT DOCUMENTS

| | | | |
|---|---|---|---|
| 2013/0023204 A1* | 1/2013 | Ode | H04B 7/15507 455/11.1 |
| 2013/0094432 A1* | 4/2013 | Cai | H04B 7/15542 370/315 |
| 2013/0142107 A1* | 6/2013 | Ohta | H04W 72/0446 370/315 |
| 2013/0170428 A1* | 7/2013 | Morioka | H04B 7/155 370/315 |
| 2013/0242771 A1* | 9/2013 | Ohta | H04B 7/15585 370/252 |

OTHER PUBLICATIONS

3GPP TR 36.913 V8.0.1; 3rd Generation Partnership Project; Technical Specification Group Radio Access Network; "Requirements for further advancements for Evolved Universal Terrestrial Radio Access (E-UTRA) (LTE-Advanced) (Release 8)"; Mar. 2009.

3GPP TR 36.912 V9.0.0; 3rd Generation Partnership Project; Technical Specification Group Radio Access Network; "Feasibility study for Further Advancements for E-UTRA (LTE-Advanced) (Release 9)"; Sep. 2009.

3GPP TS 36.211 V9.1.0, 3rd Generation Partnership Project; Technical Specification Group Radio Access Network; Evolved Universal Terrestrial Radio Access (E-UTRA); "Physical Channels and Modulation (Release 9)"; Mar. 2010.

3GPP TS 36.300 V9.3.0; 3rd Generation Partnership Project; Technical Specification Group Radio Access Network; Evolved Universal Terrestrial Radio Access (E-UTRA) and Evolved Universal Terrestrial Radio Access Network (E- UTRAN); "Overall description; Stage 2 (Release 9)"; Mar. 2010.

3GPP TS 36.331 V9.2.0; 3rd Generation Partnership Project; Technical Specification Group Radio Access Network; Evolved Universal Terrestrial Radio Access (E-UTRA); Radio Resource Control (RRC); "Protocol specification (Release 9)"; Mar. 2010.

3GPP TS 36.321 V9.3.0; 3rd Generation Partnership Project; Technical Specification Group Radio Access Network; Evolved Universal Terrestrial Radio Access (E-UTRA); "Medium Access Control (MAC) protocol specification (Release 9)"; Jun. 2010.

3GPP TS 36.322 V9.2.0; 3rd Generation Partnership Project; Technical Specification Group Radio Access Network; Evolved Universal Terrestrial Radio Access (E-UTRA); "Radio Link Control (RLC) protocol specification (Release 9)"; Jun. 2010.

International search report issued for corresponding International Patent Application No. PCT/JP2010/063748, mailed Nov. 16, 2010.

Non-Final Office Action issued on Jan. 2, 2015, by the United States Patent and Trademark Office for corresponding U.S. Appl. No. 13/753,176.

First Notification of Office Action issued for correponding Chinese Application No. 201080068575.7 dated Jan. 16, 2015 with an English translation.

NTT DOCOMO, "Type 1 Relay definition", 3GPP TSG-RAN Meeting #60, R1-101281, San Francisco California (US), Feb. 22-26, 2010.

Office Action issued for corresponding Canadian Patent Application No. 2,807,345 issued on Oct. 26, 2015.

* cited by examiner

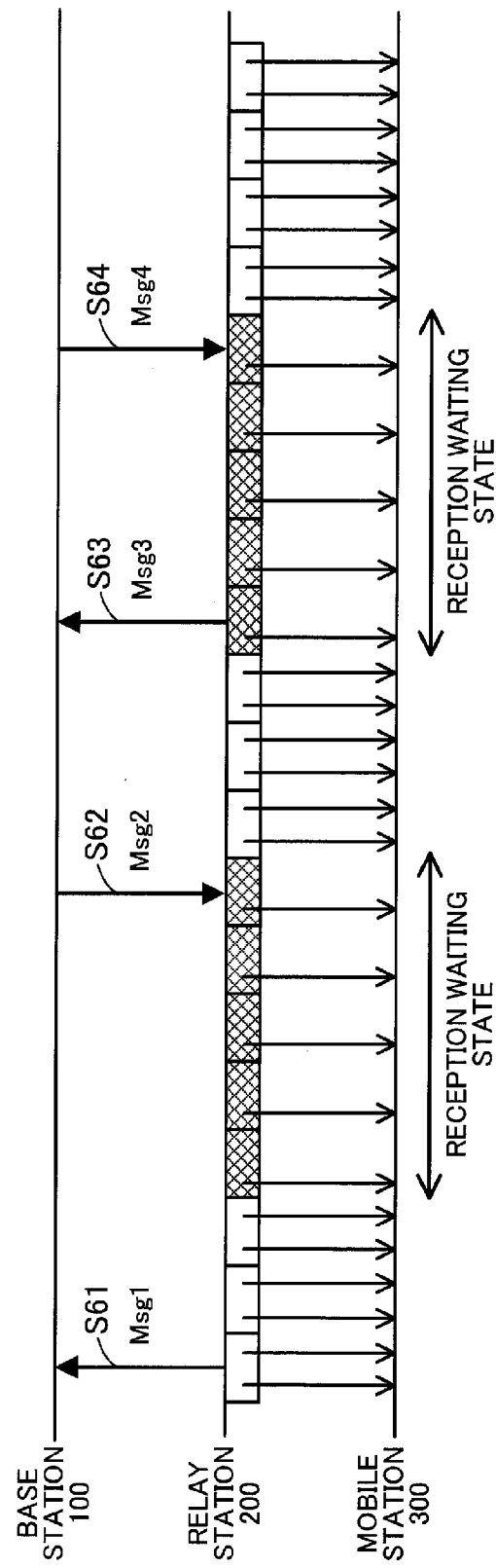

RADIO COMMUNICATION SYSTEM, BASE STATION, RELAY STATION, AND RADIO COMMUNICATION METHOD

CROSS-REFERENCE TO RELATED APPLICATION

This application is a continuation of U.S. application Ser. No. 13/753,176, filed on Jan. 29, 2013, now pending, which is a continuation of International Patent Application number PCT/JP2010/063748 filed Aug. 13, 2010 in Japan, the entire contents of each are herein incorporated by reference.

FIELD

The embodiments discussed herein are related to a radio communication system, a base station, a relay station, and a radio communication method.

BACKGROUND

At present, radio communication systems such as a cellphone system and a radio MAN (Metropolitan Area Network) are widely used. For attaining a further speeding up and large capacity of radio communication, lively discussion is continuously performed about a next generation radio communication technology. For example, the 3GPP (3rd Generation Partnership Project), which is one of international standardization organizations, proposes a standard referred to as LTE (Long Term Evolution), and a standard referred to as LTE-A (Long Term Evolution-Advanced) that is an evolution of LTE (see, for example, 3rd Generation Partnership Project, "Requirements for further advancements for Evolved Universal Terrestrial Radio Access (E-UTRA)", 3GPP TR 36.913 V8.0.1, 2009 March).

In a radio communication system including a base station and a mobile station, a relay station which relays radio communication may be provided between the base station and the mobile station. By providing a relay station, an area (dead spot) in which radio communication is difficult due to radio propagation blocking caused by buildings is covered, a range of a cell covered by a base station is expanded, and communication throughput is improved.

However, in a relay station, interference (which may be referred to as self-interference) may occur between a transmission signal of its own station and a reception signal. Suppose, for example, that a frequency band used between a base station and a relay station and a frequency band used between the relay station and a mobile station are overlapped with each other. In this case, a radio signal transmitted to the mobile station comes into a receiver of the relay station, and as a result a radio signal may not correctly be received from the base station. To cope with the problem, the relay station is proposed to be controlled in such a manner that reception of a radio signal from the base station and transmission of a radio signal to the mobile station are not performed at the same time (see, for example, section 9.3 of 3rd Generation Partnership Project, "Feasibility study for Further advancements for E-UTRA", 3GPP TR 36.912 V9.0.0, 2009 September).

Another radio communication system including a base station and a mobile station may provide a configuration in which a procedure of random access from the mobile station to the base station is specified. In the random access, the mobile station accesses the base station without being dedicatedly allocated a radio resource by the base station (see, for example, section 10.1.5 of 3rd Generation Partnership Project, "Evolved Universal Terrestrial Radio Access (E-UTRA) and Evolved Universal Terrestrial Radio Access Network (E-UTRAN); Overall description", 3GPP TS 36.300 V9.3.0, 2010 March).

As a random access preamble (which may be referred to as Msg 1), for example, the mobile station transmits to the base station a signal sequence selected from among a plurality of candidates through a predetermined random access channel. The base station, having received the Msg 1, transmits as a response a random access response (which may be referred to as Msg 2). Note that at this time, the base station does not recognize the transmission source device of the Msg 1. The mobile station, having received the Msg 2, transmits to the base station a message (which may be referred to as Msg 3) including the identifier of its own station. The base station, having received the Msg 3, transmits to the mobile station a message (which may be referred to as Msg 4) as a response.

Here, an interval until the base station sends back the Msg 2 from reception of the Msg 1 and an interval until the base station sends back the Msg 4 from reception of the Msg 3 are not fixed, and preferably stay within a predetermined allowable range. Based on this flexibility, the base station may perform scheduling and efficiently transmit the Msg 2 and Msg 4. While the base station may transmit the Msg 2 or Msg 4, the mobile station monitors a radio signal from the base station and detects the Msg 2 or Msg 4 (see, for example, section 5.1 of 3rd Generation Partnership Project, "Evolved Universal Terrestrial Radio Access (E-UTRA); Medium Access Control (MAC) protocol specification", 3GPP TS 36.321 V9.3.0, 2010 June).

Think of a radio communication system which includes a base station, a relay station, and a mobile station, and in which the relay station performs random access to the base station. At this time, there arises a problem that how the base station and the relay station preferably perform a random access procedure. Specifically, in the conventional random access, timing at which a base station may send back a message varies. If the message is sent back at timing at which the relay station transmits a radio signal to the mobile station, the relay station may not correctly receive the message due to self-interference.

SUMMARY

According to an aspect, there is provided a radio communication system which includes: a base station; a relay station which performs wireless communications with the base station; and a mobile station which performs wireless communications with the base station or relay station, wherein: the relay station includes: a first radio communication unit which transmits a first message about random access to the base station and which receives from the base station a radio signal including a second message about the random access; and a first controller which limits reception of a radio signal from the base station at timing at which a radio signal is transmitted to the mobile station; and the base station includes: a second radio communication unit which receives the first message and transmits the second message; and a second controller which controls transmission timing of the second message based on whether a transmission source of the received first message is the relay station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 30 illustrates a random access example according to a seventh embodiment.

DESCRIPTION OF EMBODIMENTS

Figure 1:
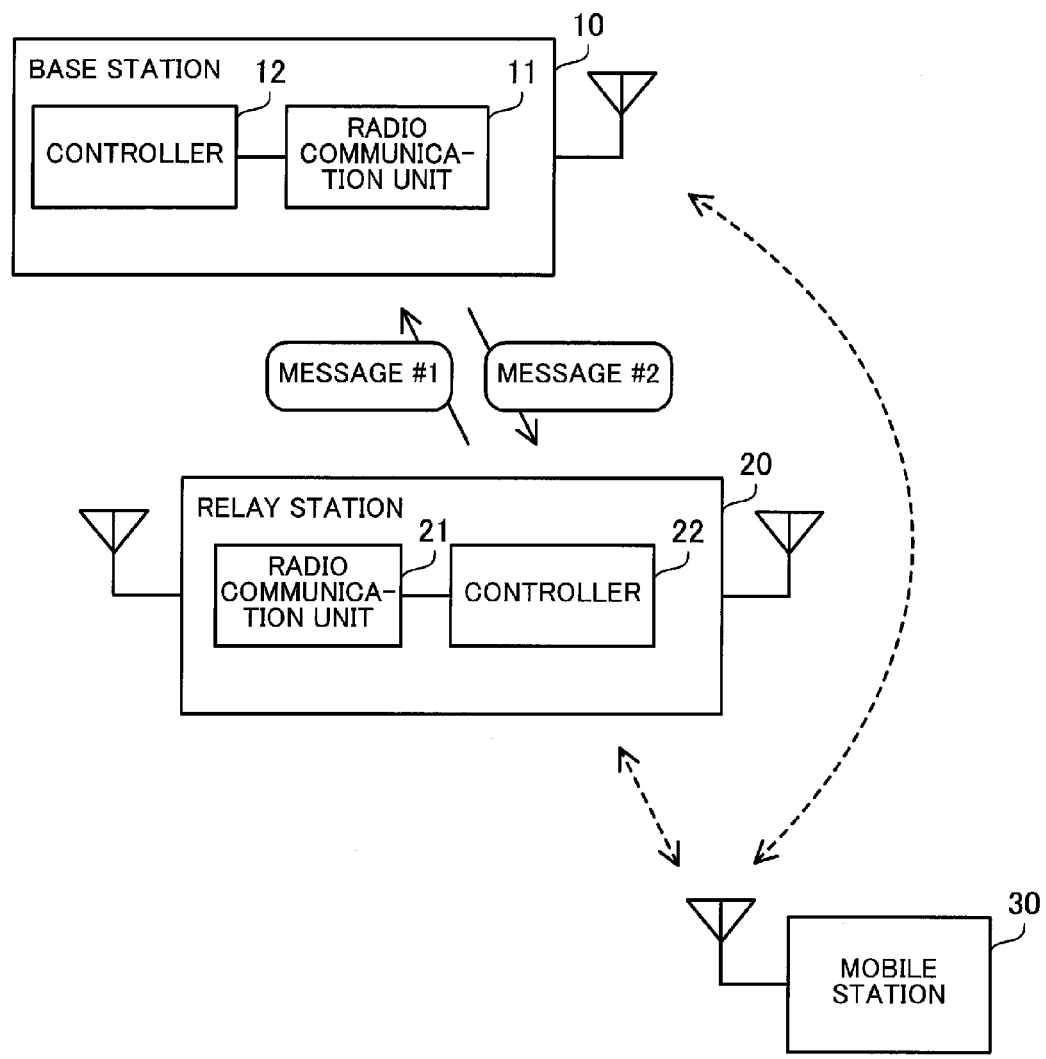
FIG. 1 illustrates a radio communication system according to a first embodiment.

Preferred embodiments of the present invention will now be described in detail below with reference to the accompanying drawings, wherein like reference numerals refer to like elements throughout.

First Embodiment

FIG. 1 illustrates a radio communication system according to a first embodiment. The radio communication system according to the first embodiment includes a base station 10, a relay station 20, and a mobile station 30. Examples of the mobile station 30 include a cellular phone and a personal digital assistant device. The relay station 20 may be a mobile radio relay station or a fixed radio relay station. The mobile station 30 performs wireless communications with the base station 10 or relay station 20. The relay station 20 performs random access (RA) to the base station 10 and establishes a connection, thus relaying data communication between the base station 10 and the mobile station 30.

The base station 10 includes a radio communication unit 11 and a controller 12. The radio communication unit 11 receives a first message (message #1) about random access and transmits a second message (message #2) about the random access. Examples of the message #1 include a Msg 1 and a Msg 3, and examples of the message #2 include a Msg 2 and a Msg 4. The controller 12 determines whether a transmission source of the message #1 received by the radio communication unit 11 is the relay station 20. Based on whether the transmission source is the relay station 20, the controller 12 then controls timing at which the radio communication unit 11 transmits the message #2.

The relay station 20 includes a radio communication unit 21 and a controller 22. The radio communication unit 21 performs wireless communications with the base station 10. During the random access, the radio communication unit 21 transmits the message #1 to the base station 10, and receives the message #2 from the base station 10. The controller 22 controls timing of radio communication so that self-interference will not occur between a radio signal received from the base station 10 and a radio signal transmitted to the mobile station 30. Concretely, at timing at which a radio signal is transmitted to the mobile station 30, the radio communication unit 21 limits reception of a radio signal from the base station 10 (e.g., stops a receiving circuit). In the radio signal transmitted to the mobile station 30 by the relay station 20, an RS (Reference Signal) used for a measurement of communication quality through the mobile station 30 is included.

Here, in the case where the message #1 is the Msg 1, examples of the method for determining a transmission source of the message #1 through the controller 12 include a method based on a signal sequence included in the message #1 and a method based on timing at which the message #1 is received. In the former method, a signal sequence for the relay station and a signal sequence for the mobile station are prepared and the radio communication unit 21 generates the message #1 by using the signal sequence for the relay station. In the case where another relay station is present in the radio communication system, the relay station 20 may use the signal sequence for the relay station shared with the another relay station. In the latter method, a RACH (random access channel) for the relay station and a RACH for the mobile station are configured separately and the radio communication unit 21 transmits the message #1 through the RACH for the relay station.

In the case where a transmission source of the message #1 is the relay station 20 (or another relay station) or the mobile station 30 (or another mobile station), the controller 12 then changes an algorithm for determining transmission timing of the message #2. In the former case, the controller 12 selects timing at which the relay station 20 does not limit reception of a radio signal. About the timing at which data is capable of being transmitted from the base station 10 to the relay station 20, for example, when some agreements have been reached between both the stations, the controller 12 selects the timing according to the agreements. On the other hand, in the latter case, the controller 12 performs scheduling and selects arbitrary timing within an allowable period.

According to the proposed radio communication system of the first embodiment, the relay station 20 limits reception of a radio signal from the base station 10 at the timing at which a radio signal is transmitted to the mobile station 30. The relay station 20 further transmits the message #1 to the base station 10. The base station 10 determines whether a transmission source of the message #1 is the relay station 20, and transmits the message #2 at timing determined according to determination results. The relay station 20 receives the message #2 from the base station 10.

As a result, the radio communication system smoothly performs random access from the relay station 20 to the base station 10. Specifically, the relay station 20 limits the reception so that self-interference will not occur between a radio signal received from the base station 10 and a radio signal transmitted to the mobile station 30. When a transmission source of the message #1 is not the mobile station 30 but the relay station 20, the base station 10 determines transmission timing of the message #2 in consideration of the limitation of the reception timing of the relay station 20. Therefore, the radio communication system suppresses the possibility that the relay station 20 cannot receive the message #2 in a normal way.

In second to seventh embodiments described below, there is included an example of a radio communication system including a base station, a relay station, and a mobile station in conformity to the LTE or LTE-A.

Second Embodiment

Figure 2:
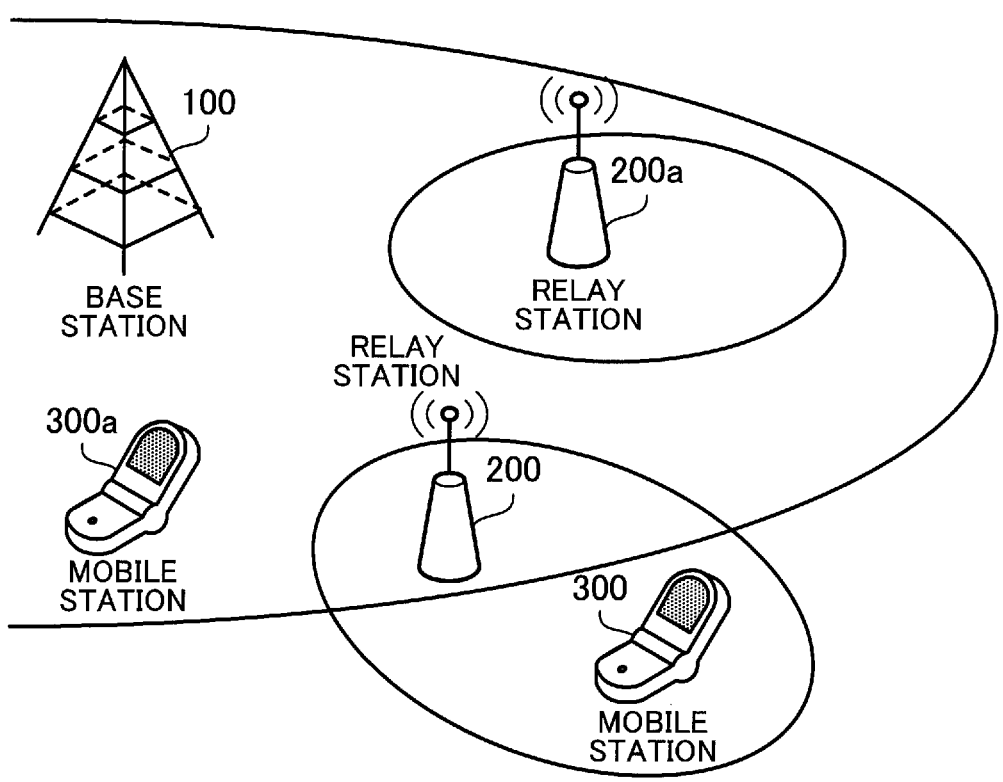
FIG. 2 illustrates a radio communication system according to a second embodiment.

FIG. 2 illustrates a radio communication system according to a second embodiment. The radio communication system according to the second embodiment includes a base station 100, relay stations 200 and 200a, and mobile stations 300 and 300a. In the following description, suppose mainly that the mobile station 300 performs data communication with the base station 100 via the relay station 200 and the mobile station 300a directly performs data communication with the base station 100.

The base station 100 is a radio communication apparatus which performs wireless communications with the relay stations 200 and 200a, and the mobile station 300a. The base station 100 is connected to a host station (not illustrated) via a wired line. The base station 100 receives data from the host station, and transfers it to the relay stations 200 and 200a, and the mobile station 300a through a downlink (DL). On the other hand, through an uplink (UL), the base station 100 receives data from the relay stations 200 and 200a, and the mobile station 300a, and transfers it to the host station.

The relay station 200 is a radio communication apparatus which relays data communication between the base station 100 and the mobile station 300. Through the DL, the relay station 200 receives data from the base station 100 and transfers it to the mobile station 300. On the other hand, through the UL, the relay station 200 receives data from the mobile station 300 and transfers it to the base station 100. In a similar fashion, the relay station 200a also relays data communication. The relay stations 200 and 200a may be mobile radio relay stations or fixed radio relay stations.

Here, the relay stations 200 and 200a correspond to a so-called Type 1 of relay station. Specifically, the relay stations 200 and 200a perform protocol processing up to a layer 3, and behave to the mobile stations 300 and 300a in the same manner as in the base station 100. From the mobile stations 300 and 300a, a cell apart from that provided by the base station 100 is viewed to be provided by the relay stations 200 and 200a. A frequency band used for radio communication between the base station and the relay station is at least partially overlapped with a frequency band used for radio communication between the relay station and the mobile station.

The mobile stations 300 and 300a are radio terminal apparatus which communicate with the base station 100. The mobile stations 300 and 300a communicate with the base station 100 via the relay stations 200 and 200a. Examples of the mobile stations 300 and 300a include a cellular phone and a personal digital assistant device. Through the DL, the mobile station 300 receives data from the relay station 200. Through the UL, on the other hand, the mobile station 300 transmits data to the relay station 200.

For radio communication through the DL, an OFDMA (Orthogonal Frequency Division Multiple Access) is used, and for radio communication through the UL, an SC-FDMA (Single Carrier Frequency Division Multiple Access) is used. Further, a base station may be called a BS (Base Station), a relay station may be called an RN (Relay Node) or an RS (Relay Station), and a mobile station may be called an MS (Mobile Station) or a UE (User Equipment).

Figure 3:
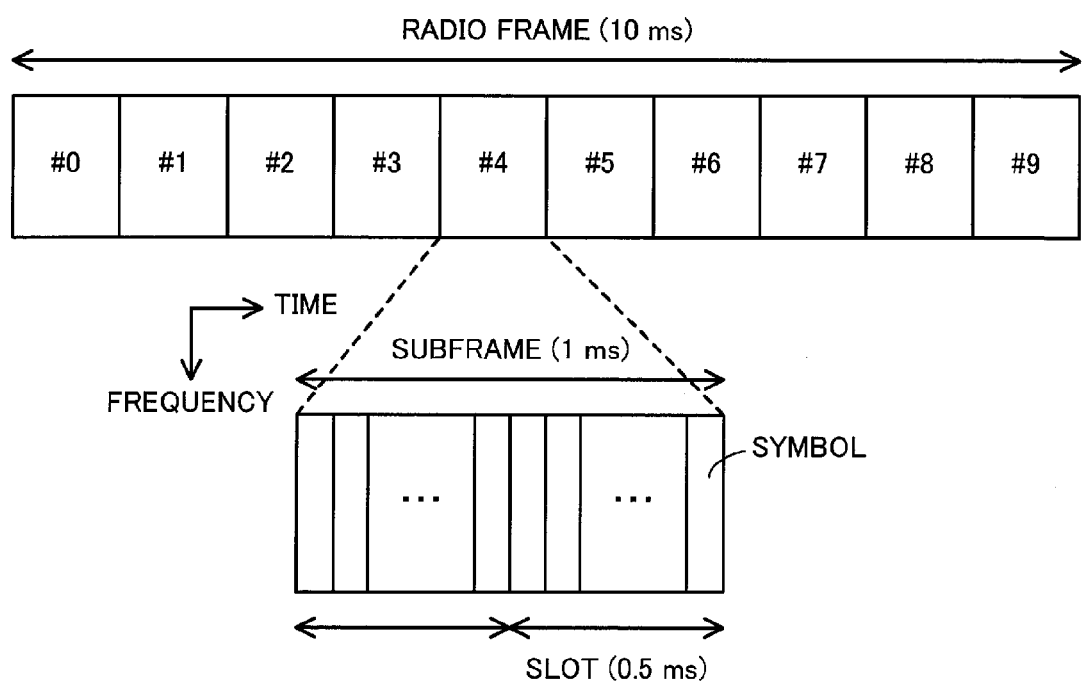
FIG. 3 illustrates a structure example of a radio frame.

FIG. 3 illustrates a structure example of a radio frame. Through each of the DL and UL, the radio frame as illustrated in FIG. 3 is transmitted and received between a base station and a relay station as well as between a relay station and a mobile station. In the second embodiment, an FDD (Frequency Division Duplex) is used as a duplex system. Note that a TDD (Time Division Duplex) may be used.

A radio frame with a width of 10 msec includes ten subframes (subframes #0 to #9) with a width of 1 msec. Each subframe includes two slots (a first-half slot and a second-half slot) with a width of 0.5 msec. Scheduling of data or control signals is performed in units of subframes. A radio resource of the subframe is segmentalized in the frequency direction or in the time direction for management. A minimum unit in the frequency direction is a sub-carrier and a minimum unit in the time direction is a symbol. The number of symbols included in the subframe may be different depending on a type of subframes.

Figure 4:
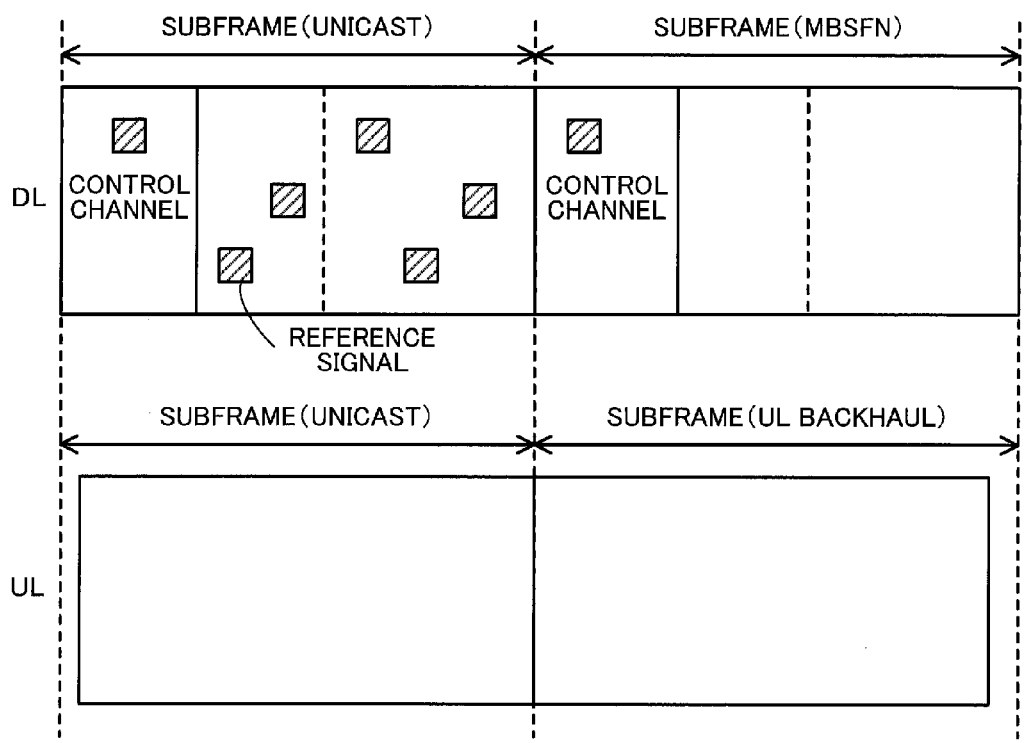
FIG. 4 illustrates a use example of a radio resource.

FIG. 4 illustrates an example of radio resource usage. A communication channel is provided on a DL subframe and an UL subframe transmitted and received by the relay stations 200 and 200a.

In the DL subframe, several symbols (one to three symbols) of the head are an area for control and remaining symbols are an area for data. On the area for control, a PDCCH (Physical Downlink Control Channel) for transmitting a physical control signal is provided. On the area for data, a PBCH (Physical Broadcast Channel) for transmitting broadcast information and an R-PDCCH (Relay Physical Downlink Control Channel) for transmitting control data on a relay are provided. On the UL subframe, a PRACH (Physical Random Access Channel) for transmitting a random access preamble is provided.

On the DL subframe, a reference signal being a pilot signal is transmitted in both of the areas for control and data. While DL data communication is not performed, a reference signal is transmitted. The mobile station 300 measures a reception power level or radio quality by using a reference signal.

Here, the relay stations 200 and 200a receive data from the base station 100 and configure a subframe (DL backhaul) which does not carry data to a subordinate mobile station. In signals in which transmission is stopped, a reference signal is also included. Note that in the area for control, the relay stations 200 and 200a are allowed to receive data from the base station 100 and transmit data to the subordinate mobile station at the same time. In other words, the relay stations 200 and 200a may stop transmitting data in both of the areas for control and data, or only in the area for data.

For example, the DL backhaul is configured so that the DL subframe of the relay stations 200 and 200a may be an MBSFN (Multimedia Broadcast multicast service Single Frequency Network) subframe. The MBSFN subframe is a subframe in which the base station 100 normally performs MBSFN transmission. The MBSFN transmission is used in the case where a plurality of transmitting stations concertedly transmit data of the same content at the same timing by using the same frequency and modulation scheme. In the second embodiment, in the radio communication system including the relay stations 200 and 200a, the MBSFN subframe is used for configuring a DL backhaul subframe of the relay stations 200 and 200a. Through the process, as illustrated in FIG. 4, for example, since the relay stations 200 and 200a do not transmit a reference signal in the area for data of the MBSFN subframe, self-interference does not occur even if the relay stations 200 and 200a receive data in the area.

The relay stations 200 and 200a further transmit data to the base station 100 and configure a subframe (UL backhaul) in which data is not received from a subordinate mobile station. Timing for the DL backhaul and timing for the UL backhaul may be the same or different from each other.

The relay stations 200 and 200a configured with the UL backhaul do not give data transmission permissions (UL grant) before a predetermined time (e.g., four subframes) from the UL backhaul. As a result, the subordinate mobile stations do not transmit data in the UL backhaul. Further, the relay stations 200 and 200a do not transmit data to the subordinate mobile stations before a predetermined time from the UL backhaul. As a result, the subordinate mobile stations do not transmit an ACK (Acknowledgement)/NACK (Negative Acknowledgement) in the UL backhaul.

Note that the relay stations 200 and 200a control timing at which the subordinate mobile stations transmit data as described above. Therefore, even in every subframe except the predetermined UL backhaul, the relay stations 200 and 200a can stop receiving data from the subordinate mobile station and transmit data to the base station 100 through scheduling.

In addition, timing for the backhaul has been agreed between the base station 100 and the relay stations 200 and 200a. The relay stations 200 and 200a may determine the timing and notify the base station 100 of the timing. Or, alternatively, the base station 100 may determine the timing and notify the relay stations 200 and 200a of the timing. The timing for the backhaul may be different between the relay stations 200 and 200a. The relay stations 200 and 200a broadcast information indicating the timing for the backhaul. The mobile station 300 recognizes the timing based on the broadcast information received from the relay station 200.

Figure 5:
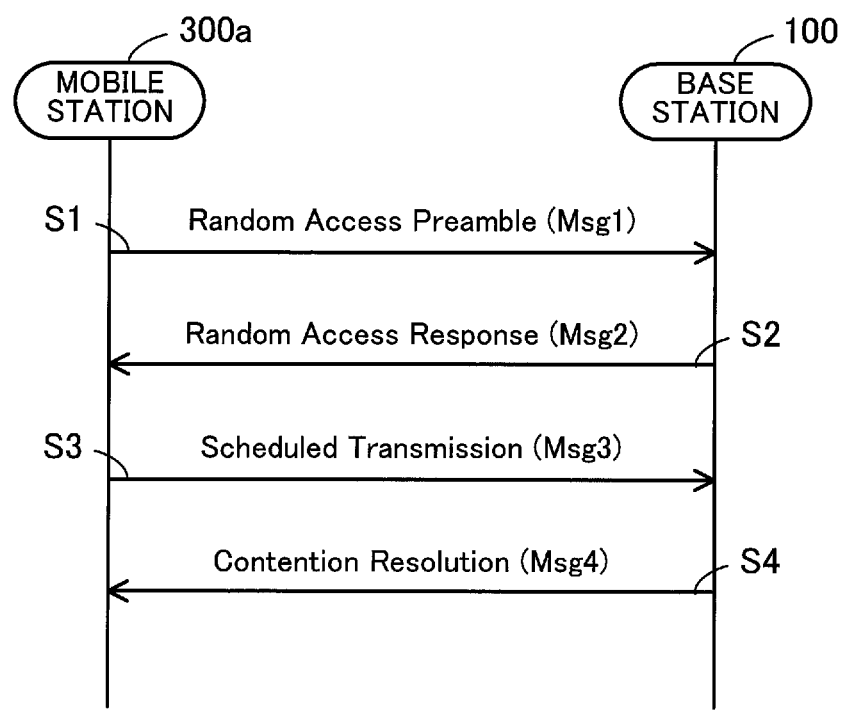
FIG. 5 is a sequence diagram illustrating a procedure example of random access.

FIG. 5 is a sequence diagram illustrating a procedure example of the random access. Here, the mobile station 300a performs random access to the base station 100. The procedure of the random access illustrated in FIG. 5 includes the following steps:

(Step S1) The mobile station 300a selects one signal sequence from among candidates of a plurality of signal sequences and transmits it as a random access preamble (Msg 1) through the PRACH. Hereinafter, the random access preamble may be referred to simply as a preamble.

(Step S2) After detecting Msg 1, the base station 100 transmits a random access response (Msg 2). The Msg 2 is transmitted within a predetermined period. More specifically, the base station 100 transmits the Msg 2 within a period of A pieces of subframes counted after three subframes from the subframe in which the Msg 1 is received. A value of A is previously set to any of 2, 3, 4, 5, 6, 7, 8, and 10.

(Step S3) Within the period in which the Msg 2 may be transmitted, the mobile station 300a monitors a received signal from the base station 100. After detecting the Msg 2, the mobile station 300a transmits a message (Msg 3) called a scheduled transmission to the base station 100. In the Msg 3, an identifier of the mobile station 300a is included.

(Step S4) The base station 100 receives the Msg 3 from the mobile station 300a and transmits a message (Msg 4) called Contention Resolution to the mobile station 300a. The Msg 4 is transmitted within a predetermined period. More specifically, the base station 100 transmits the Msg 4 within B pieces of subframes counted from the subframe in which the Msg 3 is received. A value of B is previously set to any of 8, 16, 24, 32, 40, 48, 56, and 64. Within the period in which the Msg 4 may be transmitted, the mobile station 300a monitors a received signal from the base signal 100.

Incidentally, a clue (RA trigger) in which random access is performed includes the following.

(1) Abnormality is detected in a connection between the base station 100 and the mobile station 300a. The abnormality in the connection includes a case where a timer T310 is time out as described in 3rd Generation Partnership Project, "Evolved Universal Terrestrial Radio Access (E-UTRA); Radio Resource Control (RRC); Protocol specification", 3GPP TS 36.331 V9.2.0, 2010 March and a case of failing in retransmission control of data in an RLC (Radio Link Control) layer.

(2) The mobile station 300a receives an instruction of starting a handover from a base station as a handover source, and accesses a base station as a handover destination.

(3) The mobile station 300a fails in access to the base station 100 by using a scheduling request scheme. The scheduling request scheme is an access scheme in which the mobile station 300a transmits a scheduling request to the base station 100 by using a radio resource for control data and receives an allocation of a radio resource for data transmission.

(4) The mobile station 300a fails in data transmission to the base station 100 by using a contention based uplink transmission method. The contention based uplink transmission method is a method in which the mobile station 300a transmits data to the base station 100 by using a radio resource shared by a plurality of mobile stations. Failure in the data transmission may be caused by the contention. The contention based uplink transmission method is described, for example, in a collection of writing about 3GPP (R2-093812, "Contention based uplink transmission").

(5) The mobile station 300a fails in security authentication.

(6) The mobile station 300a fails in reconfiguration of a radio resource, namely, reconfiguration of RRC (Radio Resource Control) connection. Reconfiguration of the RRC connection is described, for example, in a section 5.3.5.5 of 3rd Generation Partnership Project, "Evolved Universal Terrestrial Radio Access (E-UTRA); Radio Resource Control (RRC); Protocol specification", 3GPP TS 36.331 V9.2.0, 2010 March.

Even at the time of the random access from the relay stations 200 and 200a to the base station 100, the Msg 1 to Msg 4 are transmitted in the same manner as in the random access from the mobile station 300a to the base station 100. Note that in the case of the relay stations 200 and 200a, transmission timing of the Msg 2 and Msg 4 is different from that of the mobile station 300a.

Figure 6:
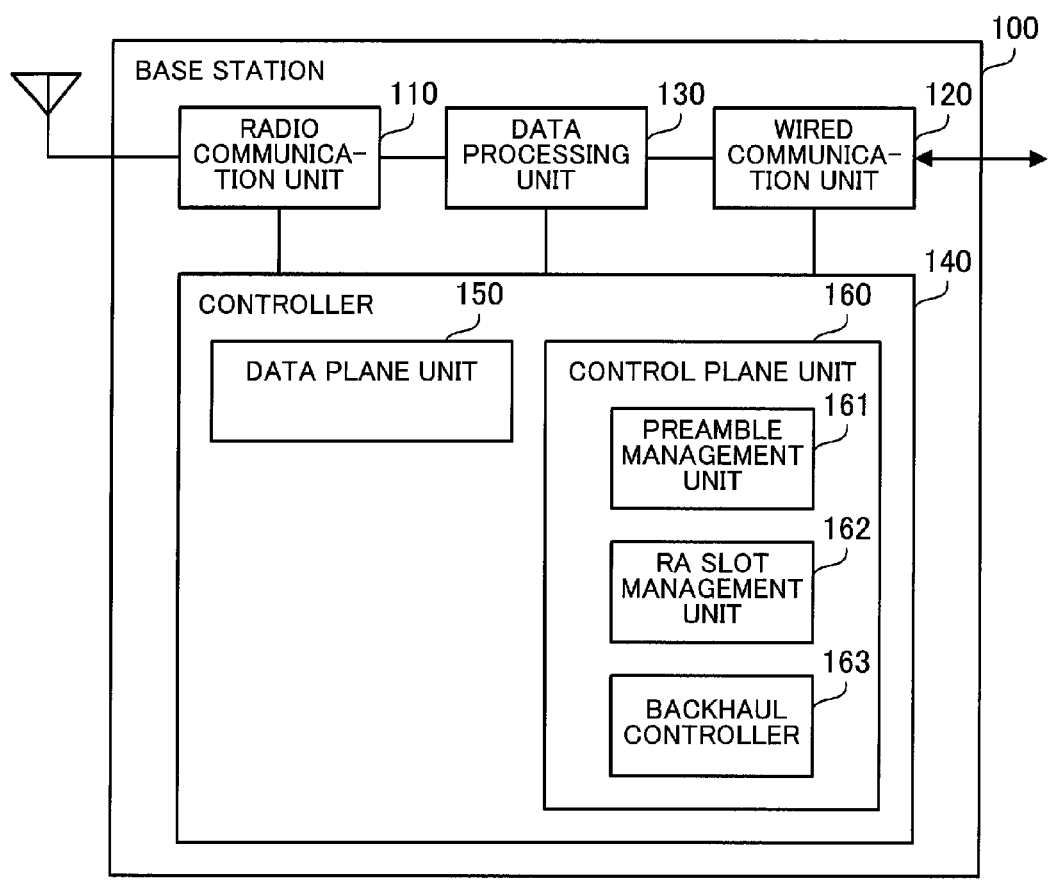
FIG. 6 is a block diagram illustrating a base station.

FIG. 6 is a block diagram illustrating the base station. The base station 100 includes a radio communication unit 110, a wired communication unit 120, a data processing unit 130, and a controller 140.

The radio communication unit 110 is a radio interface which performs wireless communications with the relay stations 200 and 200a, and the mobile station 300a. The radio communication unit 110 performs signal processing including demodulation and decoding to the received radio signal, and extracts data and a control signal. The radio communication unit 110 further detects a preamble transmitted through the PRACH. The radio communication unit 110 supplies data to be transferred to a host station to the data processing unit 130. On the other hand, the radio communication unit 110 obtains data from the data processing unit 130 and generates a control signal based on an instruction from the controller 140. The radio communication unit 110 then performs signal processing including coding and modulation to data and a control signal, and outputs a radio signal.

The wired communication unit 120 is a communication interface which performs wired communication with the host station. The wired communication unit 120 receives data addressed to the mobile stations 300 and 300a from the host station, and supplies it to the data processing unit 130. On the other hand, the wired communication unit 120 converts the data obtained from the data processing unit 130 into a packet form of a wired network and transmits it to the host station.

The data processing unit 130 obtains data to be transferred to the host station from the radio communication unit 110 and supplies it to the wired communication unit 120. On the other hand, the data processing unit 130 obtains data addressed to the mobile stations 300 and 300a from the wired communication unit 120 and maps data to a radio frame under the control of the controller 140, thus supplying it to the radio communication unit 110.

The controller 140 controls processes of the radio communication unit 110, wired communication unit 120, and data processing unit 130. The controller 140 has a data plane unit 150 and a control plane unit 160. The data plane unit 150 controls transmission and reception of data between its own station and any of the relay stations 200 and 200a and the mobile station 300a. The control plane unit 160 controls transmission and reception of a control signal between its own station and any of the relay stations 200 and 200a and the mobile station 300a.

Namely, the control plane unit 160 obtains the control signal extracted by the radio communication unit 110 and performs communication control according to the control signal. The control plane unit 160 further notifies the radio communication unit 110 of the transmitted control signal. The control plane unit 160 has a preamble management unit 161, an RA slot management unit 162, and a backhaul controller 163.

The preamble management unit 161 manages candidates of the preambles used for random access. When a preamble for the relay station and a preamble for the mobile station are distinguished, the preamble management unit 161 determines whether the preamble detected by the radio communication unit 110 is one for the relay station or one for the mobile station.

The RA slot management unit 162 manages a slot (RA slot) in which the PRACH is configured. When an RA slot for the relay station and an RA slot for the mobile station are distinguished, the RA slot management unit 162 determines whether a slot in which a preamble is detected by the radio communication unit 110 is one for the relay station or one for the mobile station. Further, the RA slot management unit 162 may dynamically configure an RA slot according to occurrence conditions of an RA trigger or configuration status of a DL backhaul of the relay stations 200 and 200a.

The backhaul controller 163 manages backhauls of the relay stations 200 and 200a, and controls timing of transmission and reception of a radio signal. When a random access source is the relay station, the backhaul controller 163 refers to configuration status of the DL backhaul of the relay stations 200 and 200a, and determines timing for transmitting the Msg 2 or Msg 4.

Figure 7:
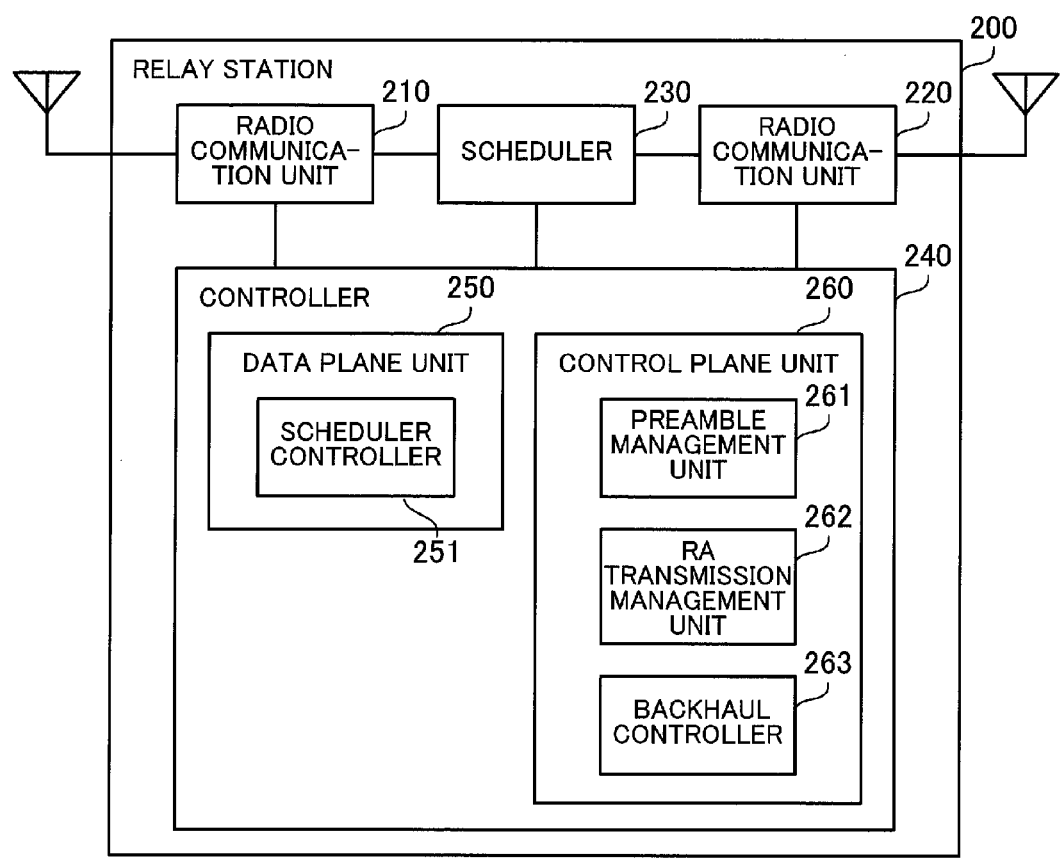
FIG. 7 is a block diagram illustrating a relay station.

FIG. 7 is a block diagram illustrating the relay station. The relay station 200 includes radio communication units 210 and 220, a scheduler 230, and a controller 240. The relay station 200a is also deployed through the same block structure as that of the relay station 200.

The radio communication unit 210 is a radio interface which performs wireless communications with the base station 100. The radio communication unit 210 performs signal processing including demodulation and decoding to the received radio signal, and extracts data or a control signal. The radio communication unit 210 supplies data addressed to the mobile station 300 to the scheduler 230. On the other hand, the radio communication unit 210 obtains data from the scheduler 230 and generates a control signal or a preamble based on the instruction from the controller 240. The radio communication unit 210 then performs signal processing including coding and modulation and outputs a radio signal.

The radio communication unit 220 is a radio interface which performs wireless communications with the mobile station 300. The radio communication unit 220 performs signal processing including demodulation and decoding to the received radio signal and extracts data or a control signal. The radio communication unit 220 supplies data to be transferred to the base station 100 to the scheduler 230. On the other hand, the radio communication unit 220 obtains data from the scheduler 230, and generates a control signal or a reference signal based on the instruction from the controller 240. The radio communication unit 220 then performs signal processing including coding and modulation, and outputs a radio signal.

The scheduler 230 schedules transfer of data from the base station 100 to the mobile station 300 and transfer of data from the mobile station 300 to the base station 100. Namely, the scheduler 230 maps data addressed to the mobile station 300 obtained from the radio communication unit 210 to a DL radio frame, and supplies it to the radio communication unit 220. On the other hand, the scheduler 230 maps data addressed to the base station 100 obtained from the radio communication unit 220 to an UL radio frame, and supplies it to the radio communication unit 210.

The controller 240 controls processes of the radio communication units 210 and 220 and the scheduler 230. The controller 240 has a data plane unit 250 and a control plane unit 260.

The data plane unit 250 controls transmission and reception of data between its own station and any of the base station 100 and the mobile station 300. The data plane unit 250 has a scheduler controller 251. The scheduler controller 251 manages a method for scheduling the scheduler 230.

The control plane unit 260 controls transmission and reception of a control signal between its own station and any of the base station 100 and the mobile station 300. Specifically, the control plane unit 260 obtains the control signal extracted by the radio communication units 210 and 220, and performs communication control according to the control signal. The control plane unit 260 further notifies the radio communication units 210 and 220 of the transmitted control signal. The control plane unit 260 has a preamble management unit 261, an RA transmission management unit 262, and a backhaul controller 263.

The preamble management unit 261 manages candidates of the preambles used in the random access, and selects a preamble used in the Msg 1 during the random access to the base station 100. When the preamble for the relay station and the preamble for the mobile station are distinguished, the preamble management unit 261 selects the preamble for the relay station.

The RA transmission management unit 262 grasps an RA slot and selects an RA slot used to transmit the Msg 1 during the random access to the base station 100. When the RA slot for the relay station and the RA slot for the mobile station are distinguished, the RA transmission management unit 262 selects the RA slot for the relay station.

The backhaul controller 263 manages a backhaul of its own station and controls timing of transmission and reception of a radio signal. Particularly, at least in the area for data of the DL backhaul, the backhaul controller 263 does not transmit data or a reference signal to the mobile station 300. In addition to the backhaul used in normal data communication, the backhaul controller 263 may configure a temporary backhaul during the random access.

Figure 8:
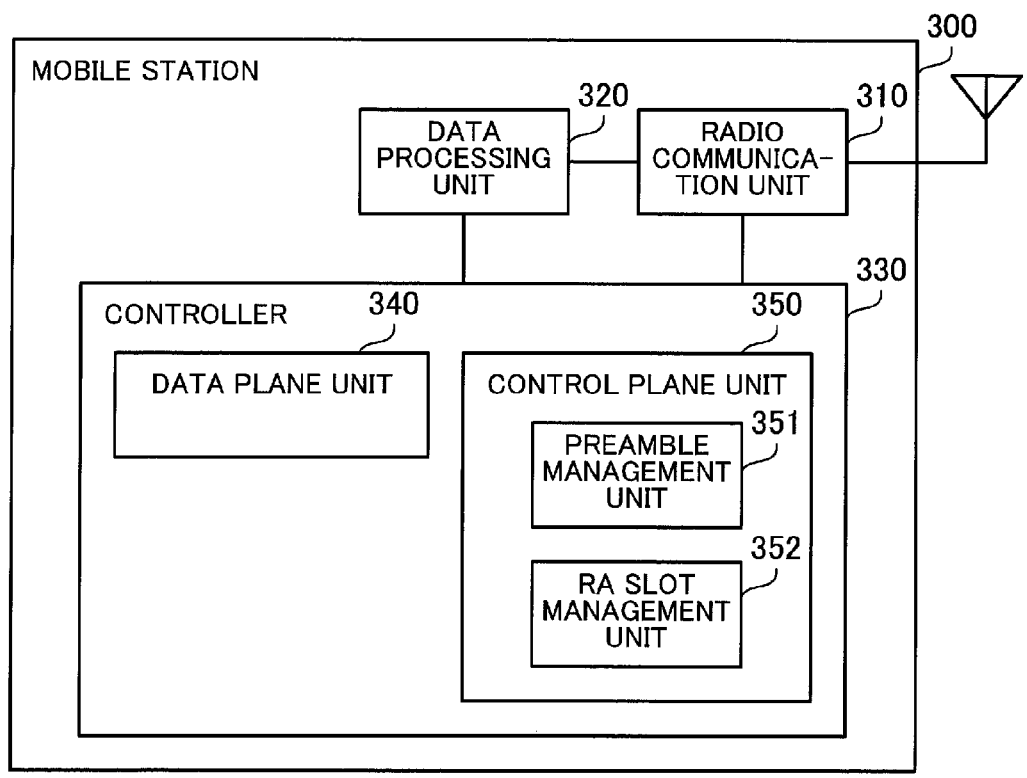
FIG. 8 is a block diagram illustrating a mobile station.

FIG. 8 is a block diagram illustrating the mobile station. The mobile station 300 includes a radio communication unit 310, a data processing unit 320, and a controller 330. The mobile station 300a is also deployed by using the same block structure as that of the mobile station 300.

The radio communication unit 310 is a radio interface which performs wireless communications with the relay station 200 or base station 100. The radio communication unit 310 performs signal processing including demodulation and decoding to the received radio signal, and extracts data or a control signal. The radio communication unit 310 supplies the extracted data to the data processing unit 320. On the other hand, the radio communication unit 310 obtains data from the data processing unit 320 and generates a control signal based on the instruction from the controller 330. The radio communication unit 310 then performs signal processing including coding and modulation, and outputs a radio signal.

The data processing unit 320 generates data to be transmitted to the relay station 200 or base station 100 and supplies it to the radio communication unit 310. On the other hand, the data processing unit 320 obtains data addressed to its own station from the radio communication unit 310 and performs a process according to a type of data.

The controller 330 controls processes of the radio communication unit 310 and the data processing unit 320. The controller 330 has a data plane unit 340 and a control plane unit 350. The data plane unit 340 controls transmission and reception of radio data. The control plane unit 350 controls transmission and reception of a radio control signal. The control plane unit 350 has a preamble management unit 351 and an RA slot management unit 352.

The preamble management unit 351 manages candidates of the preambles used in the random access, and selects the preamble used in the Msg 1 during the random access to the relay station 200 or base station 100. When the preamble for the relay station and the preamble for the mobile station are distinguished, the preamble management unit 351 selects the preamble for the mobile station.

The RA slot management unit 352 grasps an RA slot, and selects an RA slot used to transmit the Msg 1 during the random access to the relay station 200 or base station 100. When the RA slot for the relay station and the RA slot for the mobile station are distinguished, the RA slot management unit 352 selects the RA slot for the mobile station.

With regard to the random access, processes performed by the base station 100, relay station 200 and mobile station 300 (or mobile station 300a) will be described below. In the second embodiment, the base station 100 determines based on the used preamble whether a transmission source of the Msg 1 is the relay station or mobile station.

Figure 9:
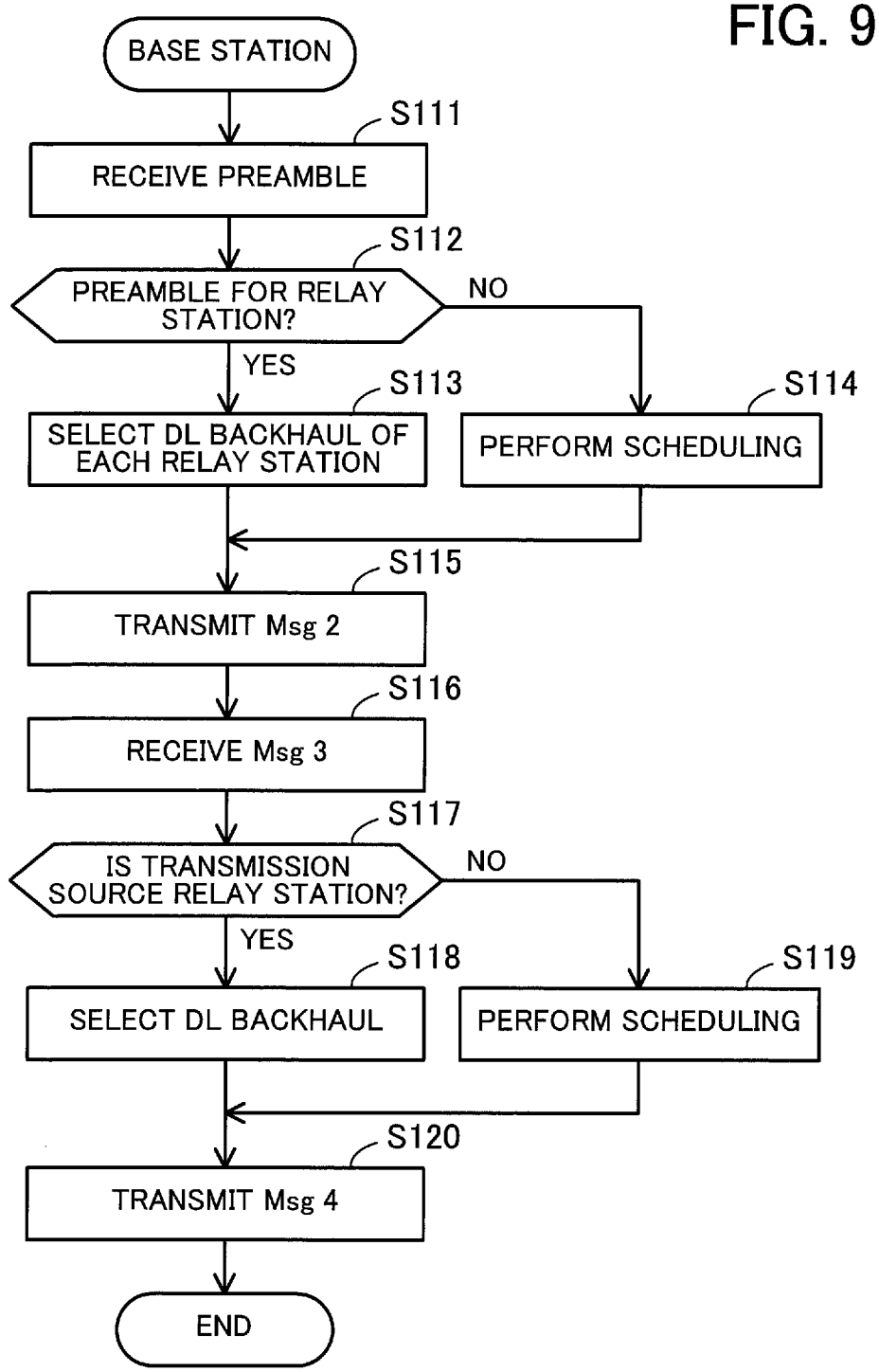
FIG. 9 is a flowchart illustrating a process of a base station according to a second embodiment.

FIG. 9 is a flowchart illustrating a process of the base station according to the second embodiment. The process illustrated in FIG. 9 includes the following steps:

(Step S111) The radio communication unit 110 receives the preamble (Msg 1) through the PRACH. At this time, a transmission source of the Msg 1 is not concretely identified.

(Step S112) The preamble management unit 161 determines whether the received preamble is a preamble for the relay station. If so, the process advances to step S113. If not, the process proceeds to step S114.

(Step S113) The backhaul controller 163 selects a DL backhaul of each of the relay stations 200 and 200a within the period in which the Msg 2 is transmitted (namely, the period within A pieces of subframes after three subframes from the subframe in which the Msg 1 is received). The process then proceeds to step S115.

(Step S114) The control plane unit 160 performs scheduling and selects an arbitrary subframe within the period in which the Msg 2 is transmitted.

(Step S115) The radio communication unit 110 transmits the Msg 2 through the PDCCH or R-PDCCH of the subframe selected at step S113 or S114. In the case where a plurality of subframes are selected at step S113 when timing of the DL backhauls is different between the relay stations 200 and 200a, the radio communication unit 110 transmits the Msg 2 in each subframe. The reason is that whether at the time of receiving the Msg 1, any of the relay stations 200 and 200a transmit the Msg 1 is not identified.

(Step S116) The radio communication unit 110 receives the Msg 3.

(Step S117) The control plane unit 160 determines a transmission source of the Msg 3. The transmission source of the Msg 3 is determined by using an identifier included in the Msg 3. If the transmission source is the relay station, the process advances to step S118. If the transmission source is not the relay station, the process proceeds to step S119. Here, the transmission source is supposed to be the relay station 200.

(Step S118) The backhaul controller 163 selects a DL backhaul of the relay station 200 within the period (namely, the period within B pieces of subframes counted from the subframe in which the Msg 3 is received) in which the Msg 4 is transmitted. The process then proceeds to step S120. Since the transmission source of the Msg 3 is concretely identified at the time of receiving the Msg 3, the backhaul controller 163 need not select a DL backhaul of the relay station 200a.

(Step S119) The control plane unit 160 performs scheduling and selects an arbitrary subframe within the period in which the Msg 4 is transmitted.

(Step S120) The radio communication unit 110 transmits the Msg 4 through the PDCCH or R-PDCCH of the subframe selected at step S118 or S119.

Figure 10:
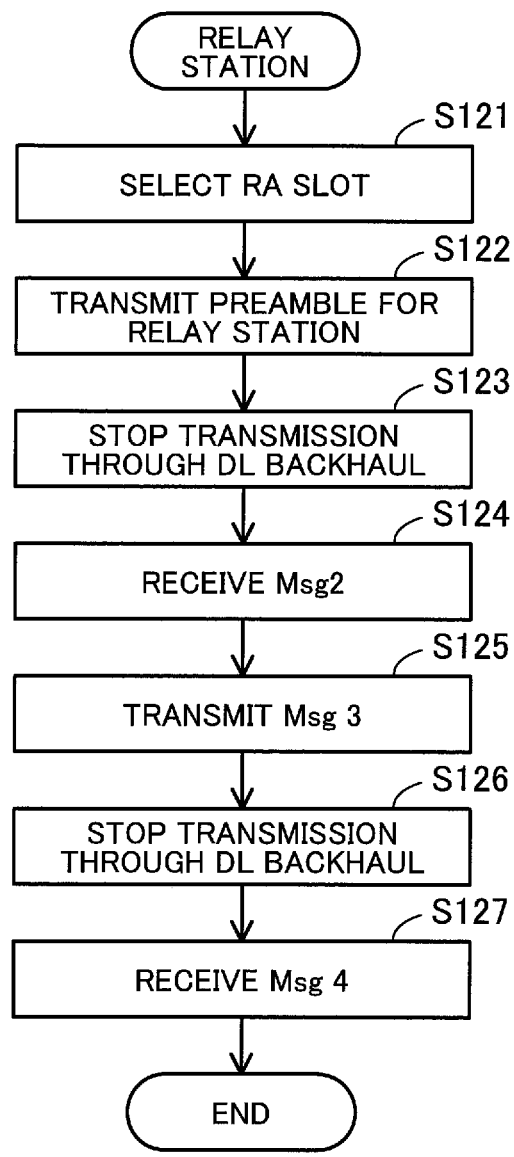
FIG. 10 is a flowchart illustrating a process of a relay station according to a second embodiment.

FIG. 10 is a flowchart illustrating a process of the relay station according to the second embodiment. The process illustrated in FIG. 10 includes the following steps:

(Step S121) The radio communication unit 210 receives broadcast information through the PBCH from the base station 100. In the broadcast information, information on timing of the RA slot is included. The RA slot may be shared by the relay station and the mobile station. The RA transmission management unit 262 selects the RA slot of the UL backhaul. Note that when reception of radio signals from the mobile station 300 may be stopped, the RA transmission management unit 262 may select RA slot except RA slot in the UL backhaul.

(Step S122) From among candidates of the preambles, the preamble management unit 261 selects a preamble for the relay station. The preamble for the relay station may be shared by the relay stations 200 and 200a. The radio communication unit 210 transmits the selected preamble by using the RA slot selected at step S121.

(Step S123) The backhaul controller 263 limits transmission of a radio signal (including a reference signal) to the mobile station 300 through the DL backhaul. When the Msg 2 is transmitted through the PDCCH, the backhaul controller 263 stops transmitting a signal in both of the areas for control and data. When the Msg 2 is transmitted through the R-PDCCH, the backhaul controller 263 stops transmitting a signal at least in the area for data.

(Step S124) The radio communication unit 210 receives the Msg 2 from the base station 100 through the PDCCH or R-PDCCH of the DL backhaul.

(Step S125) The radio communication unit 210 transmits the Msg 3 to the base station 100. Preferably, the radio communication unit 210 transmits the Msg 3 to the base station 100 through the UL backhaul.

(Step S126) The backhaul controller 263 limits transmission of a radio signal (including a reference signal) to the mobile station 300 through the DL backhaul. When the Msg 4 is transmitted through the PDCCH, the backhaul controller 263 stops transmitting a signal in both of the areas for control and data. When the Msg 4 is transmitted through the R-PDCCH, the backhaul controller 263 stops transmitting a signal at least in the area for data.

(Step S127) The radio communication unit 210 receives the Msg 4 from the base station 100 through the PDCCH or R-PDCCH of the DL backhaul. Through the above steps, the radio communication unit 210 completes a procedure of random access from the relay station 200 to the base station 100.

Figure 11:
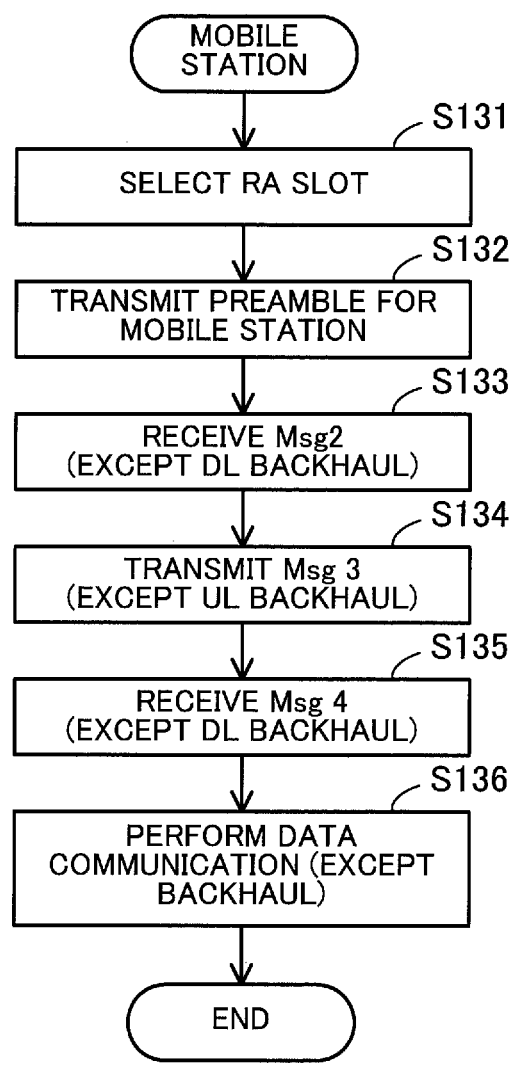
FIG. 11 is a flowchart illustrating a process of a mobile station according to a second embodiment.

FIG. 11 is a flowchart illustrating a process of the mobile station according to the second embodiment. Suppose here that the mobile station 300 performs the random access to the relay station 200 or base station 100. The process illustrated in FIG. 11 includes the following steps:

(Step S131) The radio communication unit 310 receives broadcast information through the PBCH from the relay station 200 or base station 100. In the broadcast information, information on the timing of the RA slot is included. The RA slot management unit 352 selects one RA slot.

(Step S132) The preamble management unit 351 selects one preamble for the mobile station from among candidates of the preambles. The radio communication unit 310 transmits the selected preamble through the RA slot selected at step S131.

(Step S133) The radio communication unit 310 monitors the PDCCH within the period (namely, the period of A pieces of subframes after three subframes from the subframe in which the Msg 1 is transmitted) in which the Msg 2 is transmitted, and receives the Msg 2 from the relay station 200 or base station 100. Note that the radio communication unit 310 receives the Msg 2 in subframe except the subframe in DL backhaul.

(Step S134) The radio communication unit 310 transmits the Msg 3 to the relay station 200 or base station 100. The radio communication unit 310 transmits the Msg 3 to the relay station 200 in subframe except the subframe in UL backhaul.

(Step S135) The radio communication unit 310 monitors the PDCCH within the period (namely, the period of B pieces of subframes counted from the subframe in which the Msg 3 is transmitted) in which the Msg 4 is transmitted, and receives the Msg 4 from the relay station 200 or base station 100. Note that the radio communication unit 310 receives the Msg 4 from the relay station 200 in subframe except the subframe in DL backhaul.

(Step S136) Through the process up to step S135, the radio communication unit 310 completes a procedure of the random access from its own station to the relay station 200 or base station 100. Subsequently, the radio communication unit 310 performs data communication between its own station and any of the relay station 200 and the base station 100. Note that when connected to the relay station 200, the mobile station 300 performs data communication in subframe except the subframe in backhaul.

Figure 12:
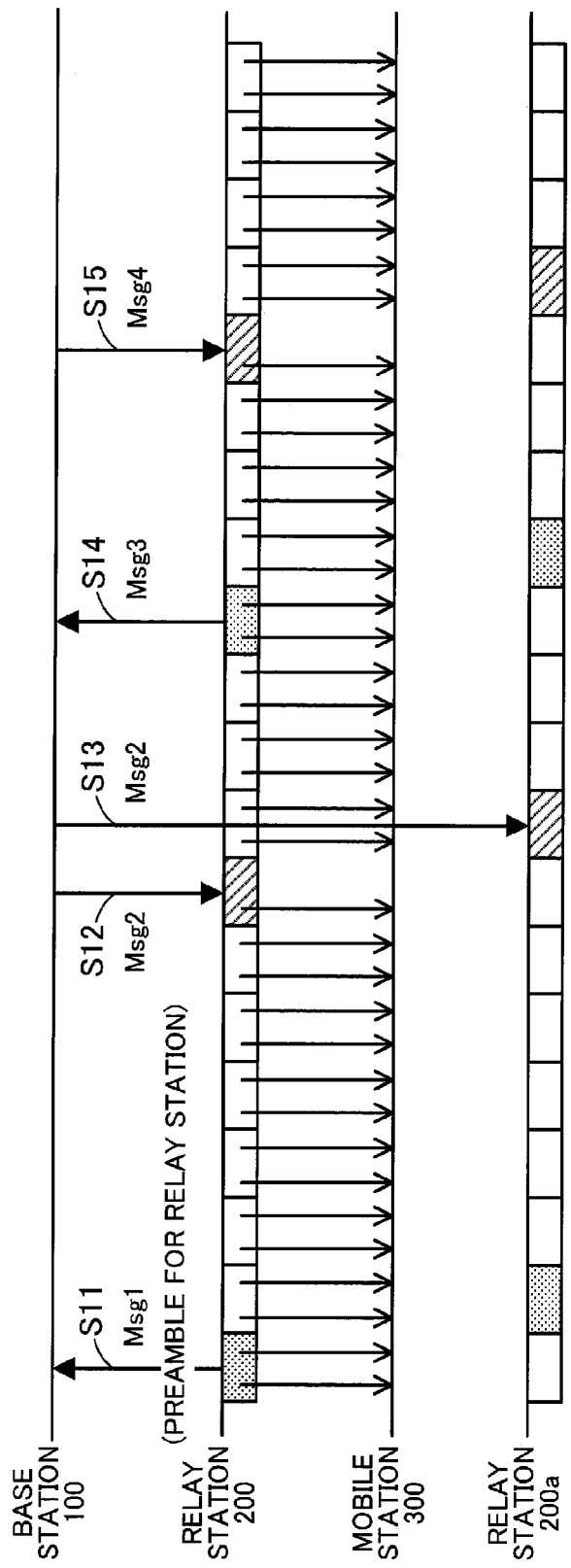
FIG. 12 illustrates a random access example according to a second embodiment.

FIG. 12 illustrates a random access example according to the second embodiment. The message flow illustrated in FIG. 12 includes the following steps:

(Step S11) The relay station 200 transmits the Msg 1 to the base station 100 through the UL backhaul. The preamble to be transmitted as the Msg 1 is a preamble for the relay station. Based on the preamble, the base station 100 recognizes that a transmission source of the Msg 1 is the relay station 200.

(Step S12) The base station 100 transmits the Msg 2 through the R-PDCCH of the DL backhaul of the relay station 200 within the period in which the Msg 2 is transmitted. When a signal such as a reference signal is not transmitted in the area for data, the relay station 200 receives the Msg 2.

(Step S13) The base station 100 transmits the Msg 2 through the DL backhaul of the relay station 200a within the period in which the Msg 2 is transmitted. Note that since the relay station 200a did not transmit Msg 1, it ignores the Msg 2 received from the base station 100.

(Step S14) The relay station 200 transmits the Msg 3 to the base station 100 through the UL backhaul. Based on an identifier included in the Msg 3, the base station 100 recognizes that a transmission source of the Msg 3 is the relay station 200.

(Step S15) The base station 100 transmits the Msg 4 through the R-PDCCH of the DL backhaul of the relay station 200 within the period in which the Msg 4 is transmitted. When a signal such as a reference signal is not transmitted in the area for data, the relay station 200 receives the Msg 4.

In the proposed radio communication system of the second embodiment, the base station 100 is configured to determine based on the preamble received as the Msg 1 whether a transmission source of the Msg 1 is the relay station or mobile station. In the case where the transmission source is the relay station, the base station 100 then controls transmission timing so that the transmission source may receive the Msg 2 through an existing DL backhaul. In the case where a transmission source of the Msg 3 is the relay station 200, the base station 100 further controls transmission timing so that the relay station 200 may receive the Msg 4 through an existing DL backhaul. According to the second embodiment, the radio communication system suppresses self-interference of the relay station 200 and smoothly performs random access from the relay station 200 to the base station 100.

Third Embodiment

A third embodiment will be described below. Since the third embodiment shares some elements with the foregoing second embodiment, the following discussion will focus on their distinctive points, omitting explanations of similar elements. The third embodiment differs from the second embodiment in a method for determining whether a transmission source of the Msg 1 is the relay station or mobile station.

A radio communication system according to the third embodiment is deployed by using the same apparatus configuration as that of the second embodiment illustrated in FIG. 2. Further, a base station, a relay station, and a mobile station according to the third embodiment are deployed by using the same block configurations as those of the second embodiment illustrated in FIGS. 6 to 8. Hereinafter, the third embodiment will be described with reference to the same reference numerals as those illustrated in FIGS. 6 to 8.

Figure 13:
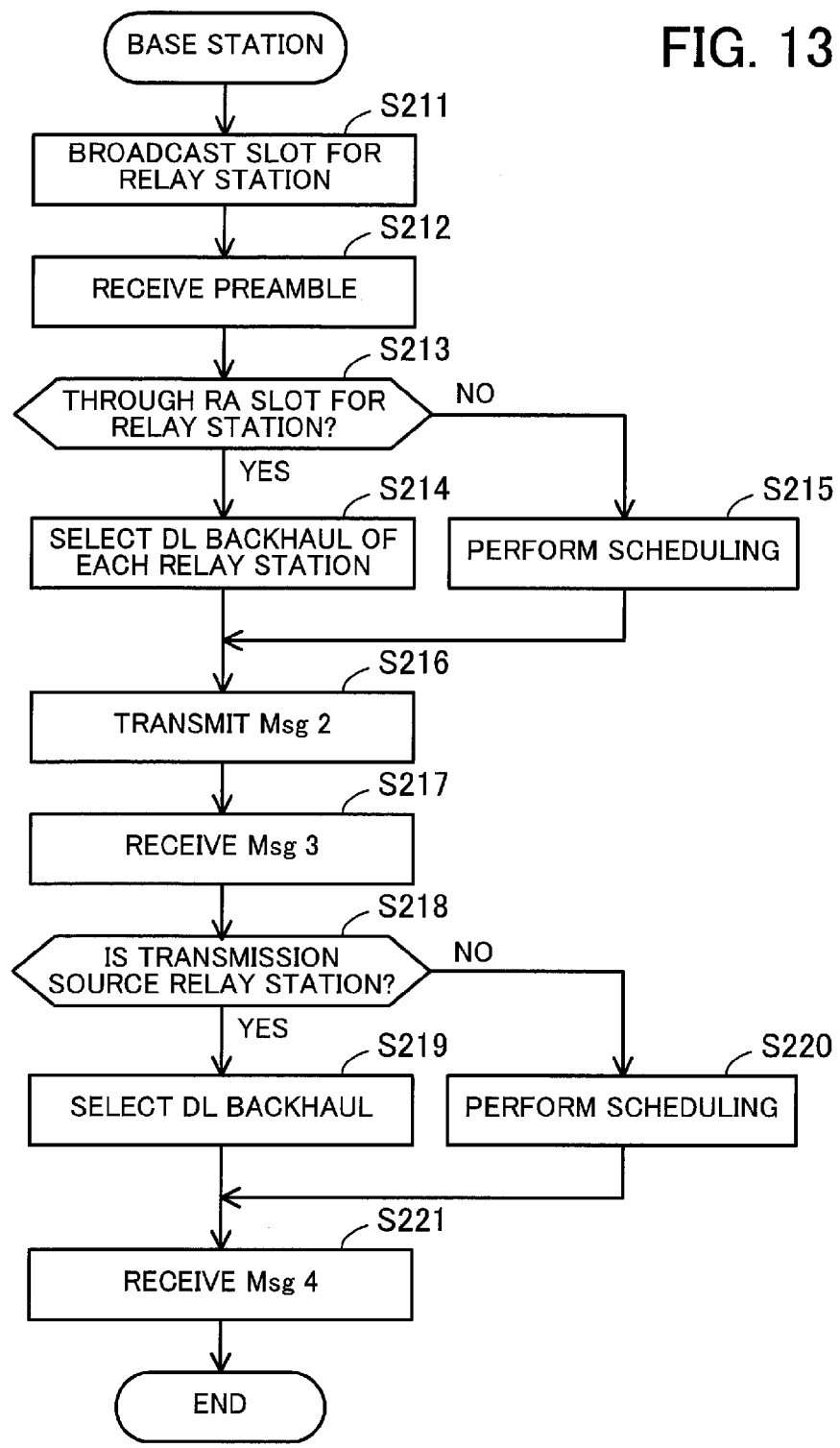
FIG. 13 is a flowchart illustrating a process of a base station according to a third embodiment.

FIG. 13 is a flowchart illustrating a process of the base station according to the third embodiment. The process illustrated in FIG. 13 includes the following steps:

(Step S211) The RA slot management unit 162 configures separate RA slots for the relay station and the mobile station. Through the PBCH, the radio communication unit 110 transmits information indicating timing of the RA slots for the mobile station and the relay station as broadcast information. Note that the radio communication unit 110 may transmit information indicating timing of the RA slot for the relay station as individual control data to the relay stations 200 and 200a.

As described in 3rd Generation Partnership Project, "Evolved Universal Terrestrial Radio Access (E-UTRA); Physical Channels and Modulation", 3GPP TS 36.211 V9.1.0, 2010 March, normal information indicating timing of the RA slot is transmitted as a parameter (PRACH Configuration Index) in the broadcast information. Suppose, for example, that the information indicating timing of the RA slot for the relay station is inserted as a new parameter into the broadcast information for transmission. The RA slot for the relay station may be set to a low frequency such as one time per 40 msec.

(Step S212) The radio communication unit 110 receives a preamble through the PRACH.

(Step S213) The RA slot management unit 162 determines whether the preamble is received through the RA slot for the relay station or the mobile station. If the preamble is received through the RA slot for the relay station, the process advances to step S214. If the preamble is received through the RA slot for the mobile station, the process proceeds to step S215.

(Step S214) The backhaul controller 163 selects each DL backhaul of the relay stations 200 and 200a within the period in which the Msg 2 is transmitted. The process then proceeds to step S216.

(Step S215) The control plane unit 160 performs scheduling and selects an arbitrary subframe within the period in which the Msg 2 is transmitted.

(Step S216) The radio communication unit 110 transmits the Msg 2 through the PDCCH or R-PDCCH of the subframe selected at step S214 or S215. When the timing of the DL backhauls is different between the relay stations 200 and 200a, the radio communication unit 110 transmits the Msg 2 through each DL backhaul.

(Step S217) The radio communication unit 110 receives the Msg 3.

(Step S218) The control plane unit 160 determines a transmission source of the Msg 3. If the transmission source is the relay station, the process advances to step S219. If the transmission source is not the relay station, the process proceeds to step S220. Here, the transmission source is supposed to be the relay station 200.

(Step S219) The backhaul controller 163 selects the DL backhaul of the relay station 200 within the period in which the Msg 4 is transmitted. The process then proceeds to step S221. The backhaul controller 163 need not select the DL backhaul of the relay station 200a.

(Step S220) The control plane unit 160 performs scheduling and selects an arbitrary subframe within the period in which the Msg 4 is transmitted.

(Step S221) The radio communication unit 110 transmits the Msg 4 through the PDCCH or R-PDCCH of the subframe selected at step S219 or S220.

Figure 14:
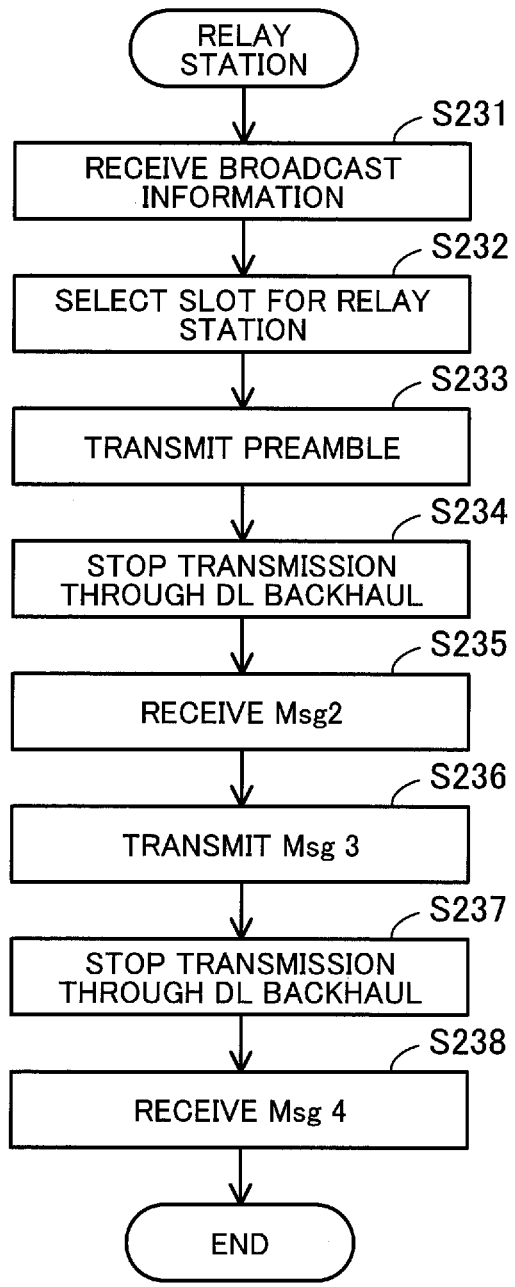
FIG. 14 is a flowchart illustrating a process of a relay station according to a third embodiment.

FIG. 14 is a flowchart illustrating a process of the relay station according to the third embodiment. The process illustrated in FIG. 14 includes the following steps:

(Step S231) Through the PBCH, the radio communication unit 210 receives broadcast information from the base station 100. In the broadcast information, information indicating timing of the RA slot for the relay station is included.

(Step S232) The RA transmission management unit 262 selects the RA slot for the relay station. The RA transmission management unit 262 preferably selects the RA slot for the relay station provided on the UL backhaul.

(Step S233) The preamble management unit 261 selects one preamble from among the candidates of the preambles. The candidates of the preambles are shared by the relay stations 200 and 200a, or by the mobile stations 300 and 300a. The radio communication unit 210 transmits the selected preamble through the RA slot selected at step S232.

(Step S234) The backhaul controller 263 limits transmission of a radio signal (including a reference signal) to the mobile station 300 through the DL backhaul.

(Step S235) The radio communication unit 210 receives the Msg 2 from the base station 100 through the PDCCH or R-PDCCH of the subframe in DL backhaul.

(Step S236) The radio communication unit 210 transmits the Msg 3 to the base station 100. Preferably, the radio communication unit 210 transmits the Msg 3 to the base station 100 through the UL backhaul.

(Step S237) The backhaul controller 263 limits transmission of a radio signal (including a reference signal) to the mobile station 300 through the DL backhaul.

(Step S238) The radio communication unit 210 receives the Msg 4 from the base station 100 through the PDCCH or R-PDCCH of the subframe in DL backhaul.

Figure 15:
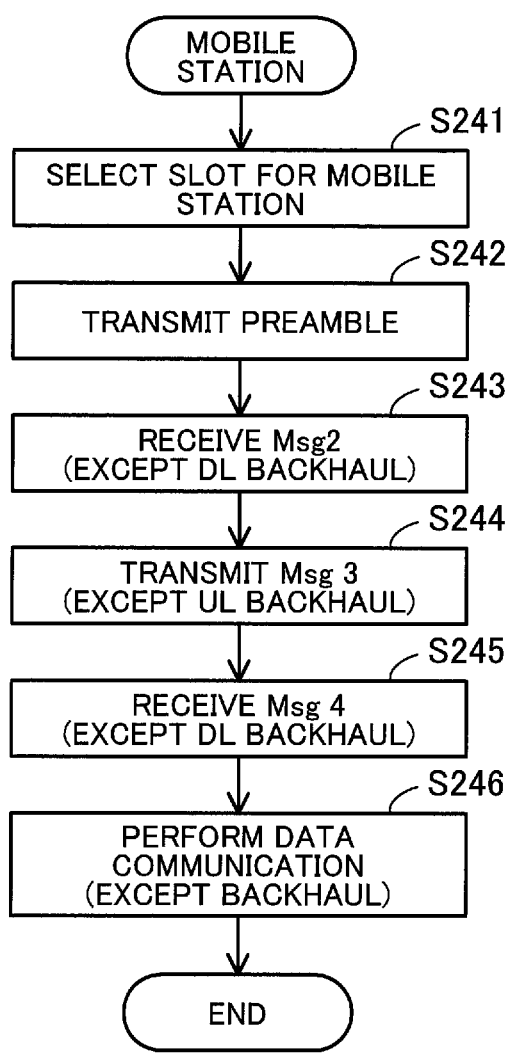
FIG. 15 is a flowchart illustrating a process of a mobile station according to a third embodiment.

FIG. 15 is a flowchart illustrating a process of the mobile station according to the third embodiment. Here, the mobile station 300 is supposed to perform random access to the relay station 200 or base station 100. The process illustrated in FIG. 15 includes the following steps:

(Step S241) The radio communication unit 310 receives broadcast information from the relay station 200 or base station 100 through the PBCH. In the broadcast information, information indicating timing of the RA slot for the mobile station is included. The RA slot management unit 352 selects the RA slot for the mobile station.

(Step S242) The preamble management unit 351 selects one preamble from among the candidates of the preambles. The candidates of the preambles are shared by the relay stations 200 and 200a or by the mobile stations 300 and 300a. The radio communication unit 310 transmits the selected preamble through the RA slot selected at step S241.

(Step S243) The radio communication unit 310 monitors the PDCCH within the period in which the Msg 2 is transmitted, and receives the Msg 2 from the relay station 200 or base station 100. Note that the radio communication unit 310 receives the Msg 2 from the relay station 200 through subframe except the subframe in DL backhaul.

(Step S244) The radio communication unit 310 transmits the Msg 3 to the relay station 200 or base station 100. The radio communication unit 310 transmits the Msg 3 to the relay station 200 through subframe except the subframe in UL backhaul.

(Step S245) The radio communication unit 310 monitors the PDCCH within the period in which the Msg 4 is transmitted, and receives the Msg 4 from the relay station 200 or base station 100. Note that the radio communication unit 310 receives the Msg 4 from the relay station 200 through subframe except the subframe in DL backhaul.

(Step S246) The radio communication unit 310 performs data communication between its own station and any of the relay station 200 and the base station 100. Note that when connected to the relay station 200, the radio communication unit 310 performs data communication through subframe except subframe in the backhaul.

Figure 16:
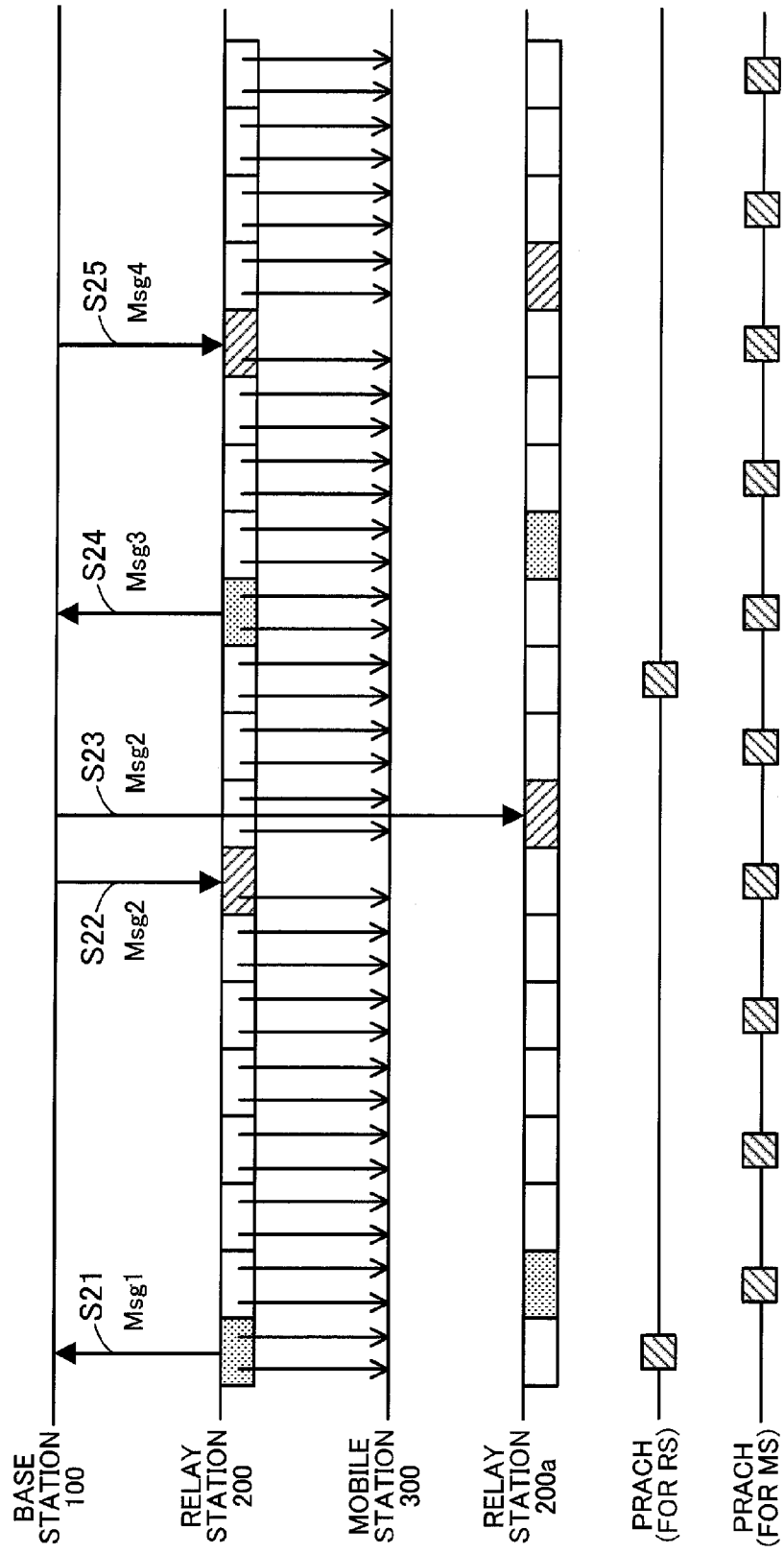
FIG. 16 illustrates a random access example according to a third embodiment.

FIG. 16 illustrates a random access example according to the third embodiment. The message flow illustrated in FIG. 16 includes the following steps:

(Step S21) The relay station 200 transmits the Msg 1 to the base station 100 through the RA slot for the relay station of the UL backhaul subframe. The preamble transmitted as the Msg 1 may be shared by the relay station and the mobile station. Based on the reception timing of the preamble, the base station 100 recognizes that a transmission source of the Msg 1 is the relay station 200.

(Step S22) The base station 100 transmits the Msg 2 through the R-PDCCH of the DL backhaul of the relay station 200 within the period in which the Msg 2 is transmitted. When a signal such as a reference signal is not transmitted in the area for data, the relay station 200 receives the Msg 2.

(Step S23) The base station 100 transmits the Msg 2 through the DL backhaul of the relay station 200a within the period in which the Msg 2 is transmitted.

(Step S24) The relay station 200 transmits the Msg 3 to the base station 100 through the UL backhaul. Based on the identifier included in the Msg 3, the base station 100 recognizes that a transmission source of the Msg 3 is the relay station 200.

(Step S25) The base station 100 transmits the Msg 4 through the R-PDCCH of the DL backhaul of the relay station 200 within the period in which the Msg 4 is transmitted. When a signal such as a reference signal is not transmitted in the area for data, the relay station 200 receives the Msg 4.

Incidentally, the base station 100 need not always configure the RA slot for the relay station. Specifically, the base station 100 may configure the RA slot after detecting the RA trigger about the relay stations 200 and 200a.

Figure 17:
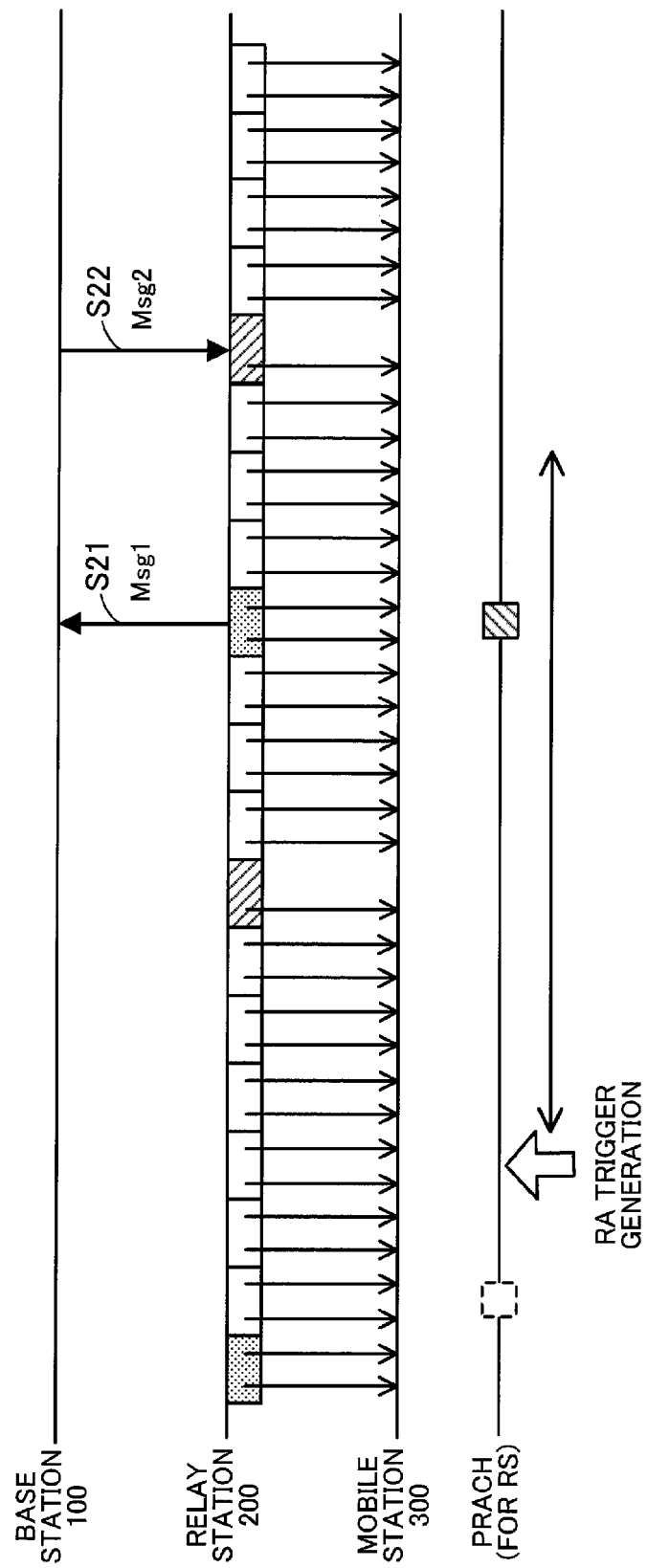
FIG. 17 illustrates another random access example according to a third embodiment.

FIG. 17 illustrates another random access example according to the third embodiment. The base station 100 does not allocate a radio resource to the PRACH for the relay station in normal situation. On the other hand, when detecting an RA trigger and determining that any of the relay stations 200 and 200a may perform random access, the base station 100 allocates a radio resource to the PRACH for the relay station. At this time, by using a timer, the base station 100 may limit a period in which a radio resource is allocated. The relay stations 200 and 200a transmit the Msg 1 within the period. As can be seen from the above discussion, when the relay stations 200 and 200a do not perform random access, the base station 100 allocates a radio resource of the RA slot used for the relay station to arbitrary channel except the PRACH, thus making use of a radio resource efficient.

According to the third embodiment, the proposed radio communication system permits the base station 100 to determine, based on the timing at which the Msg 1 is received, whether a transmission source of the Msg 1 is the relay station or mobile station. When the transmission source is the relay station, the base station 100 then controls transmission timing so that the relay station may receive the Msg 2 through an existing DL backhaul. When the transmission source of the Msg 3 is the relay station 200, the base station 100 further controls transmission timing so that the relay station 200 may receive the Msg 4 through an existing DL backhaul. According to the third embodiment, the radio communication system suppresses self-interference of the relay station 200 and smoothly performs random access from the relay station 200 to the base station 100.

Fourth Embodiment

A fourth embodiment will be described below. Since the fourth embodiment shares some elements with the foregoing second and third embodiments, the following discussion will focus on their distinctive points, omitting explanations of similar elements. The fourth embodiment differs from the second and third embodiments in timing at which the Msg 2 or 4 is transmitted.

A radio communication system according to the fourth embodiment is deployed by using the same apparatus configuration as that of the second embodiment illustrated in FIG. 2. Further, a base station, a relay station, and a mobile station according to the fourth embodiment are deployed by using the same block configurations as those of the second embodiment illustrated in FIGS. 6 to 8. Hereinafter, the fourth embodiment will be described with reference to the same reference numerals as those illustrated in FIGS. 6 to 8.

Figure 18:
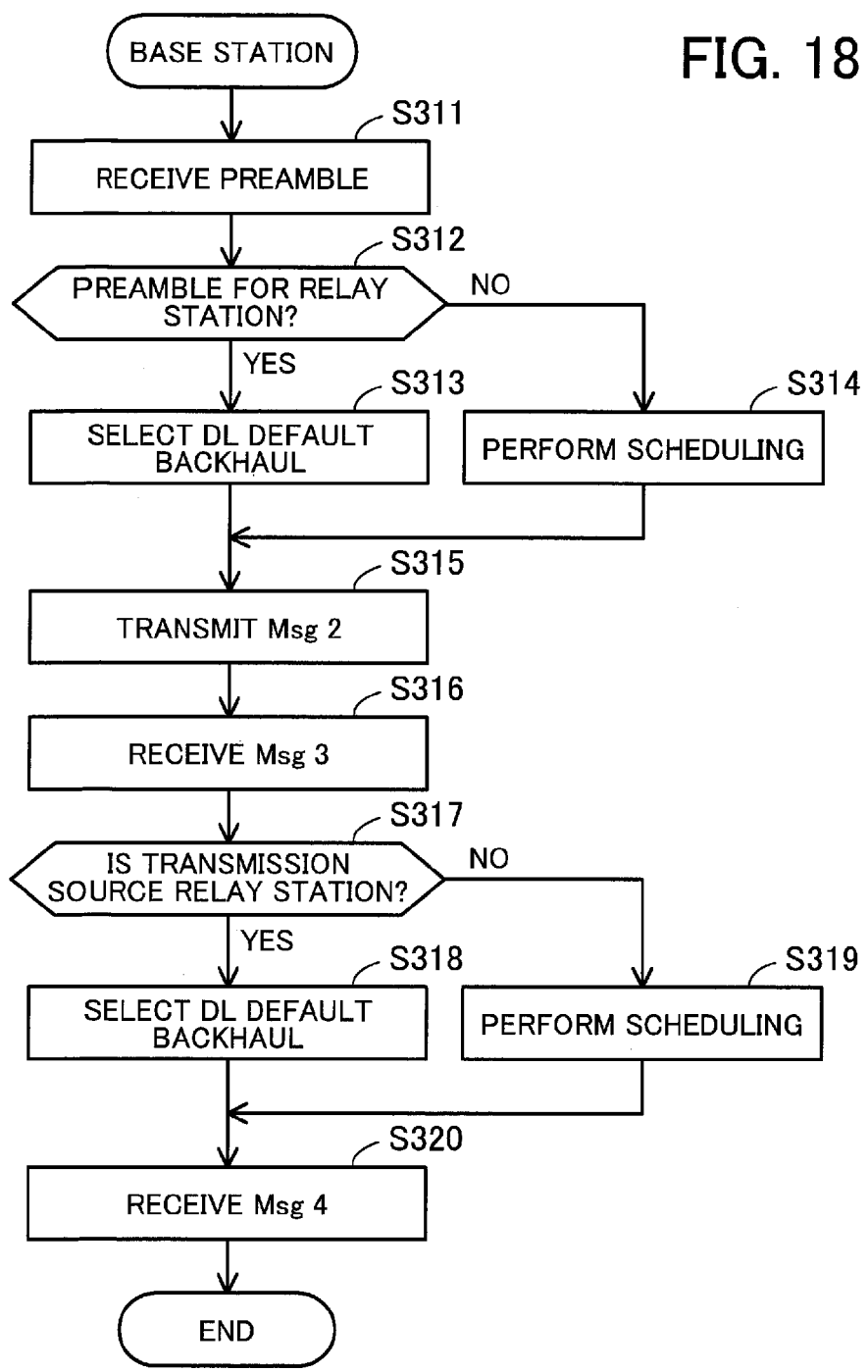
FIG. 18 is a flowchart illustrating a process of a base station according to a fourth embodiment.

FIG. 18 is a flowchart illustrating a process of the base station according to the fourth embodiment. Since processes of steps S311, S312, S314 to S317, S319, and S320 illustrated in FIG. 18 are the same as those of steps S111, S112, S114 to S117, S119, and S120 illustrated in FIG. 9, a description will not be repeated.

(Step S313) The backhaul controller 163 selects the DL default backhaul within the period in which the Msg 2 is transmitted. The default backhaul is a backhaul which is not effective in normal situation but automatically becomes effective at the time of the random access. The timing of the default backhaul is, for example, mutually configured between the relay stations 200 and 200a. The timing of the default backhaul of the relay stations 200 and 200a is previously configured between their own stations and the base station 100, and is configured, for example, by a telecommunications operator at the time of deploying the relay stations 200 and 200a.

(Step S318) The backhaul controller 163 selects the DL default backhaul within the period in which the Msg 4 is transmitted.

Figure 19:
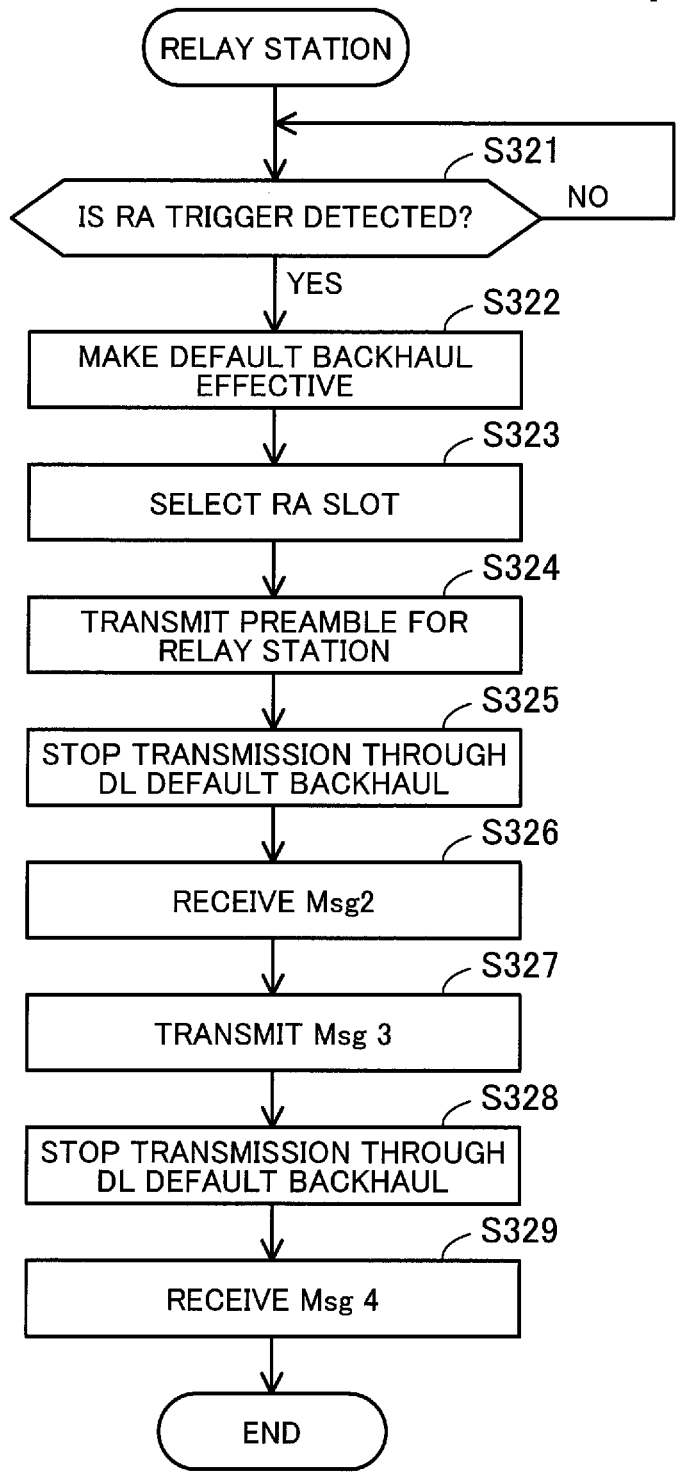
FIG. 19 is a flowchart illustrating a process of a relay station according to a fourth embodiment.

FIG. 19 is a flowchart illustrating a process of the relay station according to the fourth embodiment. The process illustrated in FIG. 19 includes the following steps:

(Step S321) The control plane unit 260 determines whether to detect the RA trigger. If so, the process proceeds to step S322. If not, the control plane unit 260 repeats a process of step S321.

(Step S322) In addition to an existing backhaul, the backhaul controller 263 makes the default backhaul with predetermined timing effective.

(Step S323) The RA transmission management unit 262 selects an RA slot of the UL default backhaul subframe. Note that when stopping receiving a radio signal from the mobile station 300, the RA transmission management unit 262 may select RA slot except that of the UL default backhaul.

(Step S324) From among the candidates of the preambles, the preamble management unit 261 selects the preamble for the relay station. The radio communication unit 210 transmits the selected preamble through the RA slot selected at step S323.

(Step S325) In addition to the DL backhaul, the backhaul controller 263 limits transmission of a radio signal to the mobile station 300 through the DL default backhaul.

(Step S326) The radio communication unit 210 receives the Msg 2 from the base station 100 through the PDCCH or R-PDCCH of the DL default backhaul.

(Step S327) The radio communication unit 210 transmits the Msg 3 to the base station 100. Preferably, the radio communication unit 210 transmits the Msg 3 to the base station 100 through the UL default backhaul.

(Step S328) In addition to the DL backhaul, the backhaul controller 263 limits transmission of a radio signal to the mobile station 300 through the DL default backhaul.

(Step S329) The radio communication unit 210 receives the Msg 4 from the base station 100 through the PDCCH or R-PDCCH of the DL default backhaul.

Figure 20:
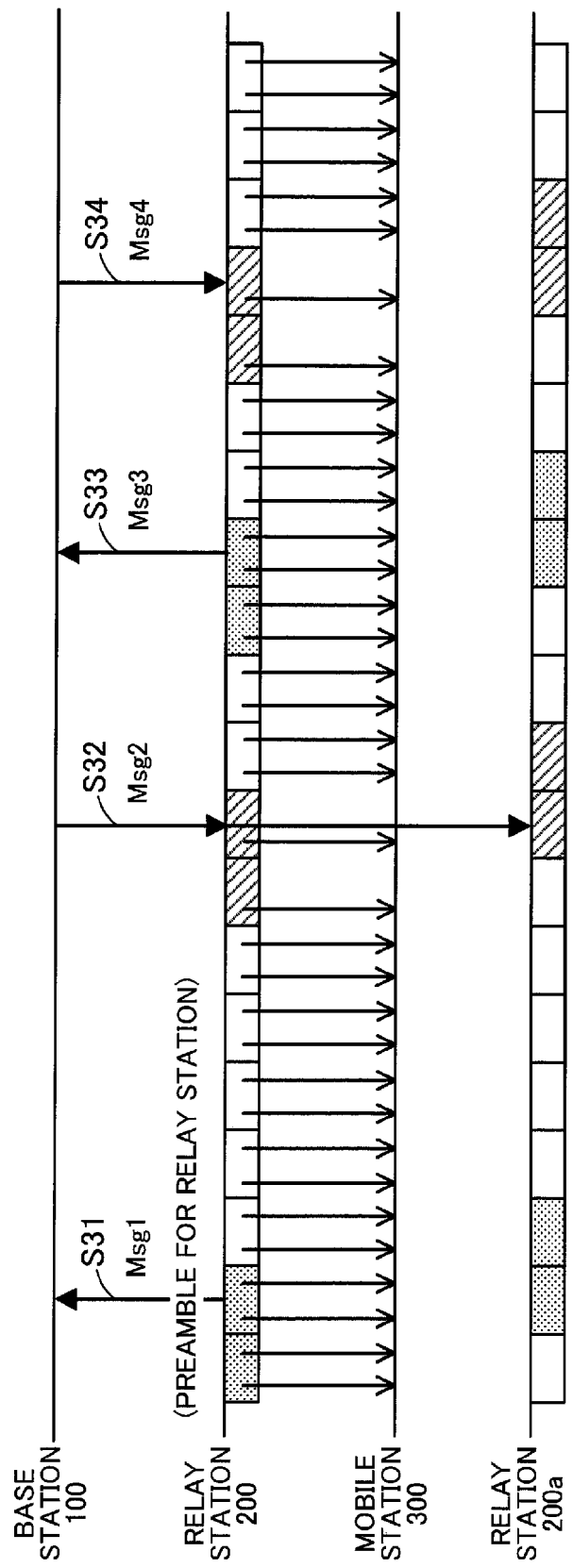
FIG. 20 illustrates a random access example according to a fourth embodiment.

FIG. 20 illustrates a random access example according to the fourth embodiment. The message flow illustrated in FIG. 20 includes the following steps:

(Step S31) The relay station 200 transmits the Msg 1 to the base station 100 through the UL default backhaul. The preamble to be transmitted is a preamble for the relay station. Based on the preamble, the base station 100 recognizes that a transmission source of the Msg 1 is the relay station.

(Step S32) The base station 100 transmits the Msg 2 through the R-PDCCH of the DL default backhaul within the period in which the Msg 2 is transmitted. The base station 100 need not transmit the Msg 2 through each DL backhaul of the relay stations 200 and 200a. When a signal such as a reference signal is not transmitted in the area for data, the relay station 200 receives the Msg 2. When the default backhaul is validated, the relay station 200a receives the Msg 2, whereas when the default backhaul is not validated, the relay station 200a does not receive the Msg 2.

(Step S33) The relay station 200 transmits the Msg 3 to the base station 100 through the UL default backhaul. Based on the identifier included in the Msg 3, the base station 100 recognizes that a transmission source of the Msg 3 is the relay station 200.

(Step S34) The base station 100 transmits the Msg 4 through the R-PDCCH of the DL default backhaul within the period in which the Msg 4 is transmitted. When a signal such as a reference signal is not transmitted in the area for data, the relay station 200 receives the Msg 4.

In the foregoing description, whether a transmission source of the Msg 1 is the relay station is determined by using a method according to the second embodiment. Further, determination may be performed by using a method according to the third embodiment.

Figure 21:
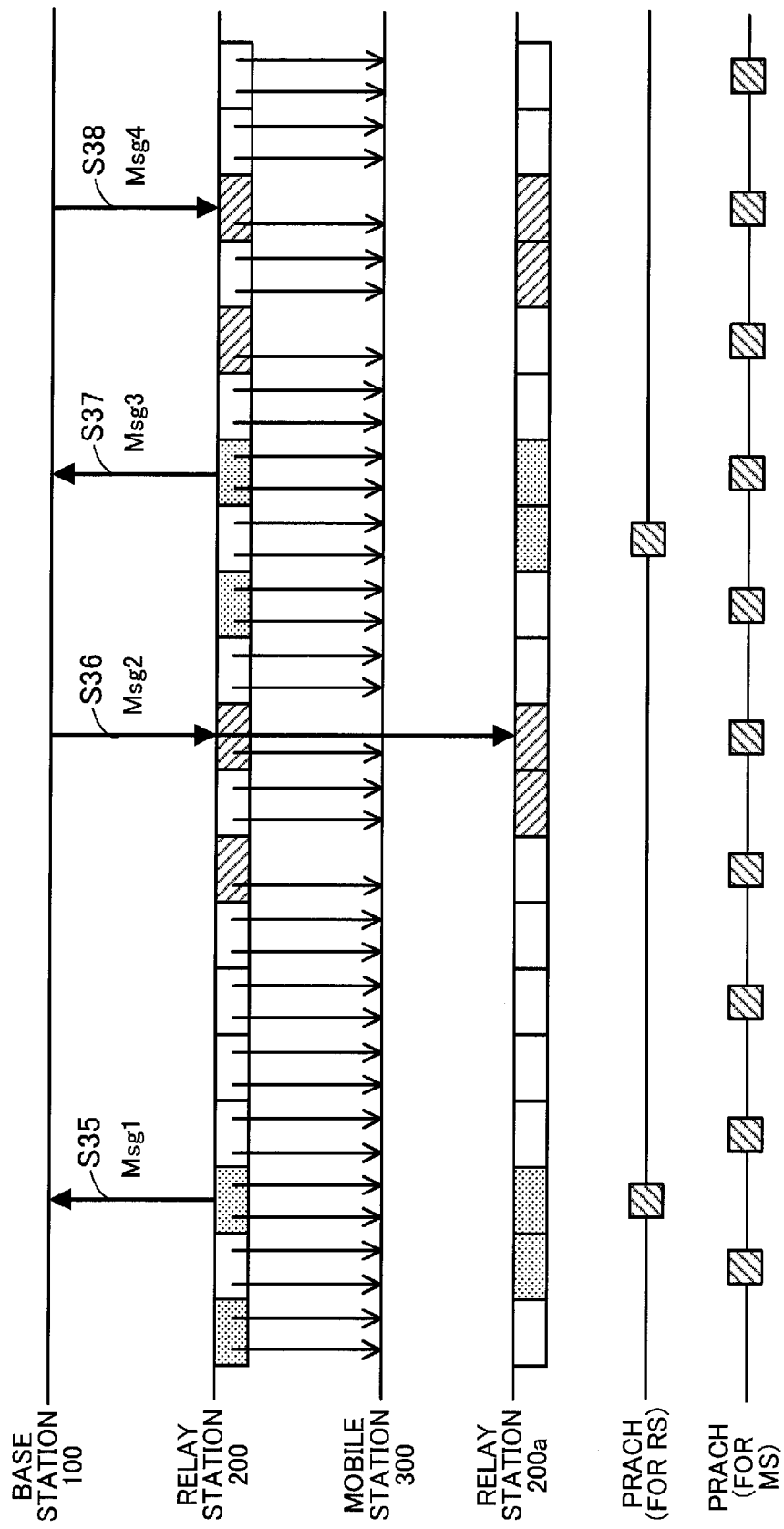
FIG. 21 illustrates another random access example according to a fourth embodiment.

FIG. 21 illustrates another random access example according to the fourth embodiment. The message flow illustrated in FIG. 21 includes the following steps:

(Step S35) The relay station 200 transmits the Msg 1 to the base station 100 through the RA slot for the relay station of the UL default backhaul subframe. Based on the reception timing of the preamble, the base station 100 recognizes that a transmission source of the Msg 1 is the relay station. After detecting the RA trigger, the base station 100 may make the RA slot for the relay station validated.

(Step S36) The base station 100 transmits the Msg 2 through the R-PDCCH of the DL default backhaul within the period in which the Msg 2 is transmitted. When a signal such as a reference signal is not transmitted in the area for data, the relay station 200 receives the Msg 2.

(Step S37) The relay station 200 transmits the Msg 3 to the base station 100 through the UL default backhaul. Based on an identifier included in the Msg 3, the base station 100 recognizes that a transmission source of the Msg 3 is the relay station 200.

(Step S38) The base station 100 transmits the Msg 4 through the R-PDCCH of the DL default backhaul within the period in which the Msg 4 is transmitted. When a signal such as a reference signal is not transmitted in the area for data, the relay station 200 receives the Msg 4.

In the fourth embodiment, in the same manner as in the second and third embodiments, the proposed radio communication system smoothly performs random access from the relay station 200 to the base station 100. Further, in the fourth embodiment, the radio communication system makes common transmission timing of the Msg 2 and Msg 4, and simplifies control of random access. A point that the transmission timing is made to be common is particularly validated in the case of random access involved in a handover.

Fifth Embodiment

A fifth embodiment will be described below. Since the fifth embodiment shares some elements with the foregoing second and third embodiments, the following discussion will focus on their distinctive points, omitting explanations of similar elements. The fifth embodiment differs from the second and third embodiments in a subframe in which an RA slot is configured.

A radio communication system according to the fifth embodiment is deployed by using the same apparatus configuration as that of the second embodiment illustrated in FIG. 2. Further, a base station, a relay station, and a mobile station according to the fifth embodiment are deployed by using the same block configurations as those of the second embodiment illustrated in FIGS. 6 to 8. Hereinafter, the fifth embodiment will be described with reference to the same reference numerals as those illustrated in FIGS. 6 to 8.

Figure 22:
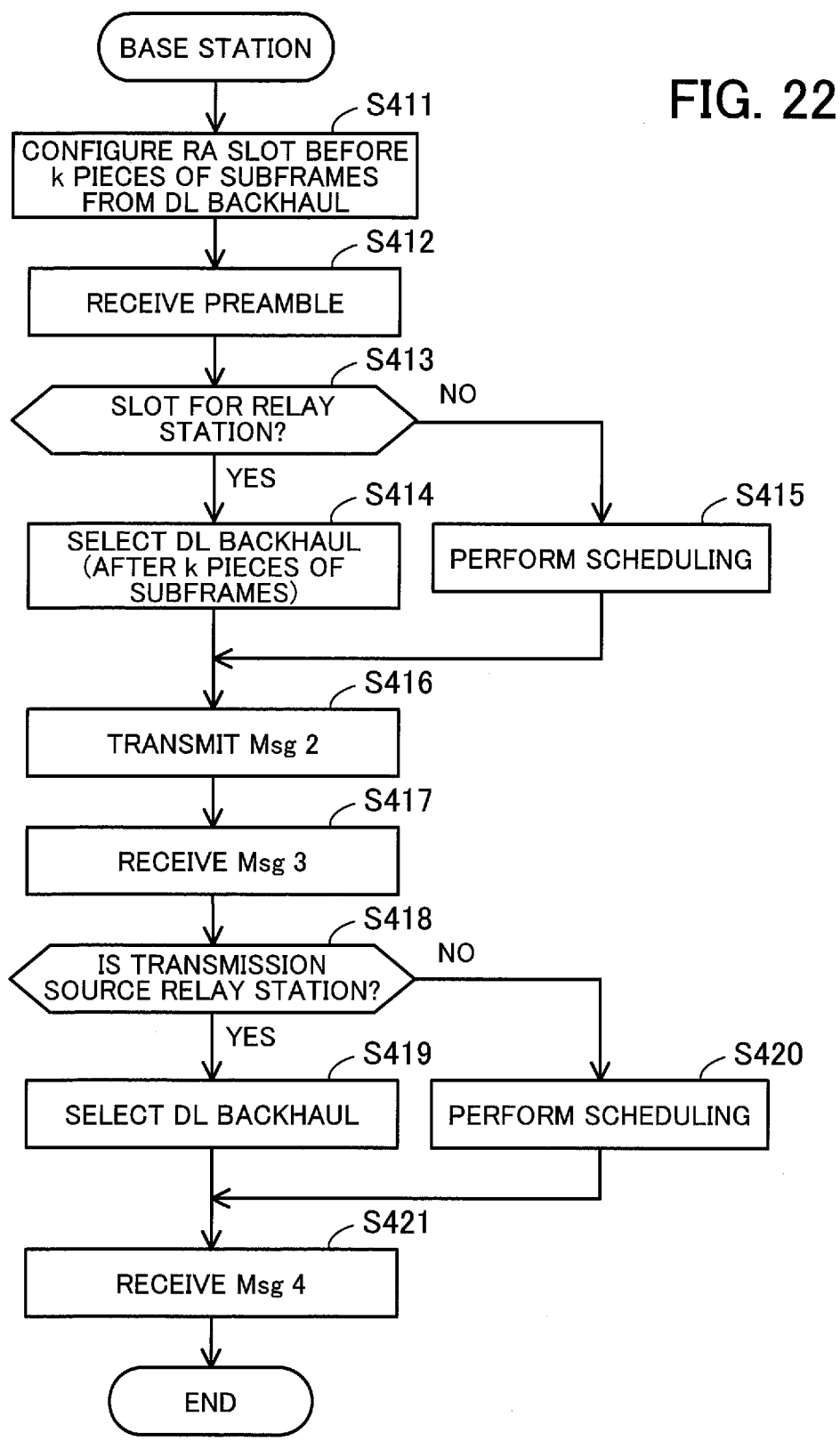
FIG. 22 is a flowchart illustrating a process of a base station according to a fifth embodiment.

FIG. 22 is a flowchart illustrating a process of the base station according to the fifth embodiment. Since processes of steps S412, S413, and S415 to S421 illustrated in FIG. 22 are the same as those of steps S212, S213, and S215 to S221 illustrated in FIG. 13, a description will not be repeated.

(Step S411) The RA slot management unit 162 configures an RA slot for the relay station in a subframe before k pieces of subframes (e.g., three subframes) from the DL backhaul of the relay stations 200 and 200a. When timing of the DL backhauls is different between the relay stations 200 and 200a, the RA slot management unit 162 configures the RA slot for the relay station before k pieces of subframes from each DL backhaul.

(Step S414) The backhaul controller 163 selects a DL backhaul after k pieces of subframes from the subframe in which the Msg 1 is received. Note that when there are circumstances that the Msg 2 cannot be transmitted from a subframe after k pieces of subframes from the above subframe, the backhaul controller 163 may select another DL backhaul after k pieces of subframes or later from the above subframe within the period in which the Msg 2 is transmitted.

Figure 23:
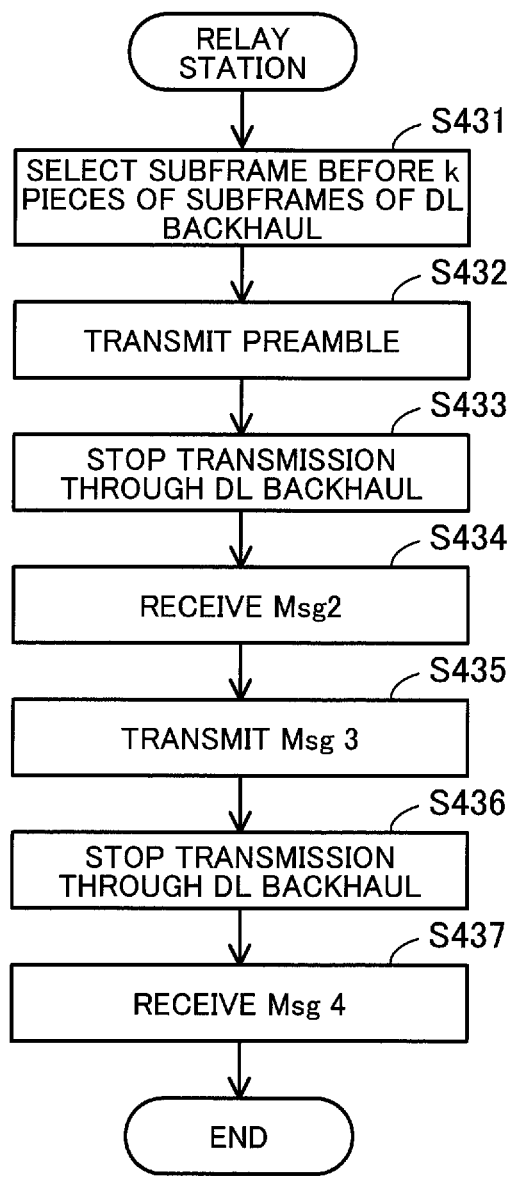
FIG. 23 is a flowchart illustrating a process of a relay station according to a fifth embodiment.

FIG. 23 is a flowchart illustrating a process of the relay station according to the fifth embodiment. Since processes of steps S432, S433, and S435 to S437 illustrated in FIG. 23 are the same as those of steps S233, S234, and S236 to S238 illustrated in FIG. 14, a description will not be repeated.

(Step S431) The RA transmission management unit 262 selects an RA slot of a subframe before k pieces of subframes (e.g., three subframes) from the DL backhaul as the RA slot for the relay station. When a subframe of the selected RA slot is not an UL backhaul subframe, the backhaul controller 263 controls that data not to be received from the mobile station 300 through the subframe.

(Step S434) The radio communication unit 210 starts monitoring the PDCCH or R-PDCCH from the DL backhaul subframe after k pieces of subframes from the subframe in which the Msg 1 is transmitted. The Msg 2 is expected to be received through the DL backhaul. Note that when the Msg 2 is not received through the DL backhaul, the radio communication unit 210 monitors the PDCCH or R-PDCCH from the DL backhaul subframe after the above subframes or later.

Figure 24:
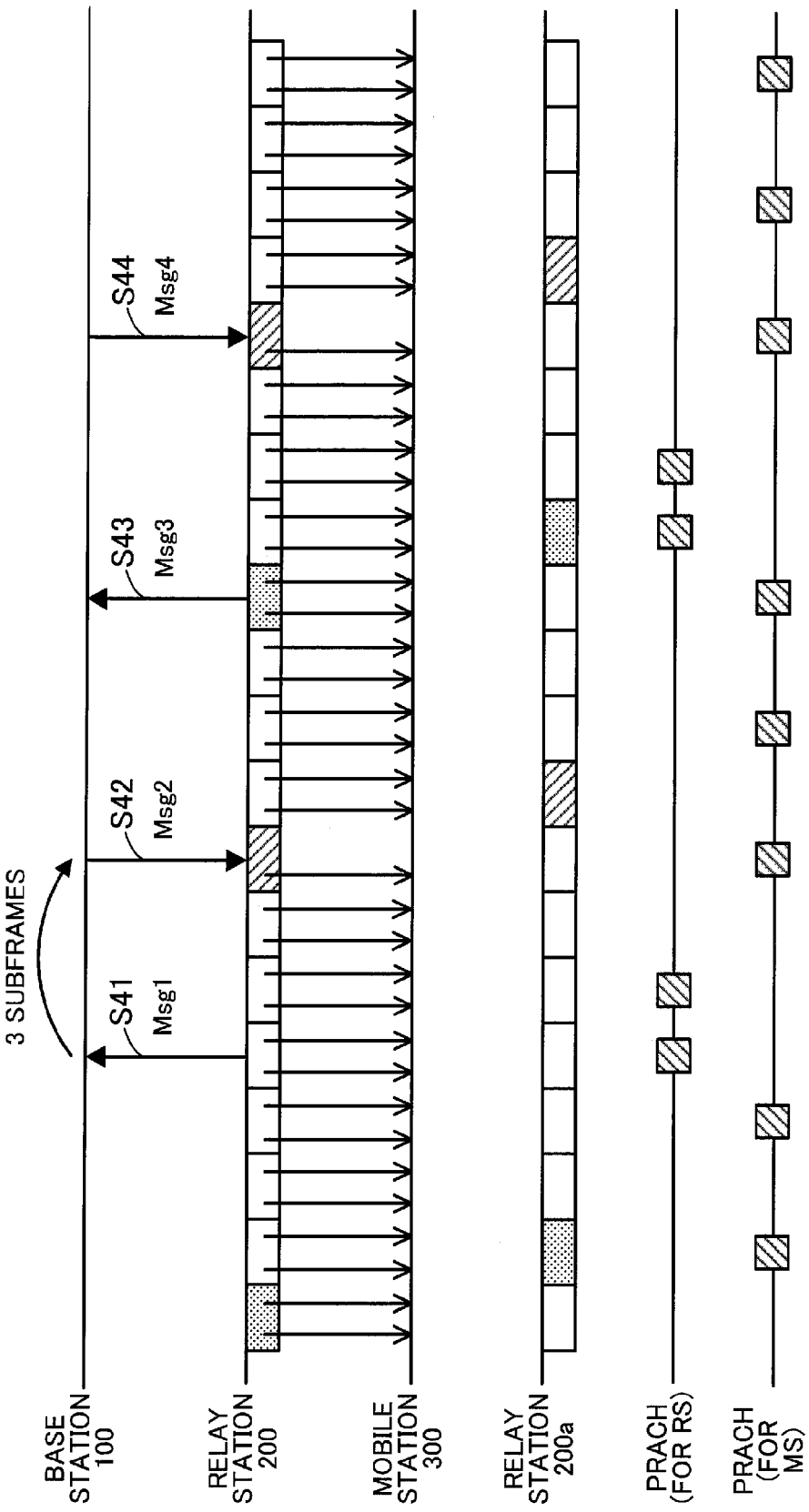
FIG. 24 illustrates a random access example according to a fifth embodiment.

FIG. 24 illustrates a random access example according to the fifth embodiment. The message flow illustrated in FIG. 24 includes the following steps:

(Step S41) The relay station 200 transmits the Msg 1 to the base station 100 through the RA slot of a subframe before three subframes from the DL backhaul subframe. Based on the reception timing of the preamble, the base station 100 recognizes that a transmission source of the Msg 1 is the relay station.

(Step S42) The base station 100 transmits the Msg 2 through the R-PDCCH of the DL backhaul subframe after three subframes from the subframe in which the Msg 1 is received. When a signal such as a reference signal is not transmitted in the area for data, the relay station 200 receives the Msg 2.

(Step S43) The relay station 200 transmits the Msg 3 to the base station 100 through the UL backhaul. Based on the identifier included in the Msg 3, the base station 100 recognizes that a transmission source of the Msg 3 is the relay station 200.

(Step S44) The base station 100 transmits the Msg 4 through the R-PDCCH of the DL backhaul of the relay station 200 within the period in which the Msg 4 is transmitted. When a signal such as a reference signal is not transmitted in the area for data, the relay station 200 receives the Msg 4.

In the foregoing description, whether a transmission source of the Msg 1 is the relay station is determined by using a method according to the third embodiment; further, may be determined by using a method according to the second embodiment.

In the fifth embodiment, in the same manner as in the second and third embodiments, the proposed radio communication system smoothly performs random access from the relay station 200 to the base station 100. Further, in the fifth embodiment, the relay station 200 smoothly starts random access even if an RA slot is not provided on the UL backhaul. In addition, the relay station 200 preferably monitors a reception signal after predetermined time after transmitting the Msg 1, thus simplifying control.

Sixth Embodiment

A sixth embodiment will be described below. Since the sixth embodiment shares some elements with the foregoing second and third embodiments, the following discussion will focus on their distinctive points, omitting explanations of similar elements. In the sixth embodiment, the Msg 2 and Msg 4 are transmitted also through subframe except the subframe in DL backhaul of the relay station.

A radio communication system according to the sixth embodiment is deployed by using the same apparatus configuration as that of the second embodiment illustrated in FIG. 2. Further, a base station, a relay station, and a mobile station according to the sixth embodiment are deployed by using the same block configurations as those of the second embodiment illustrated in FIGS. 6 to 8. Hereinafter, the sixth embodiment will be described with reference to the same reference numerals as those illustrated in FIGS. 6 to 8.

Figure 25:
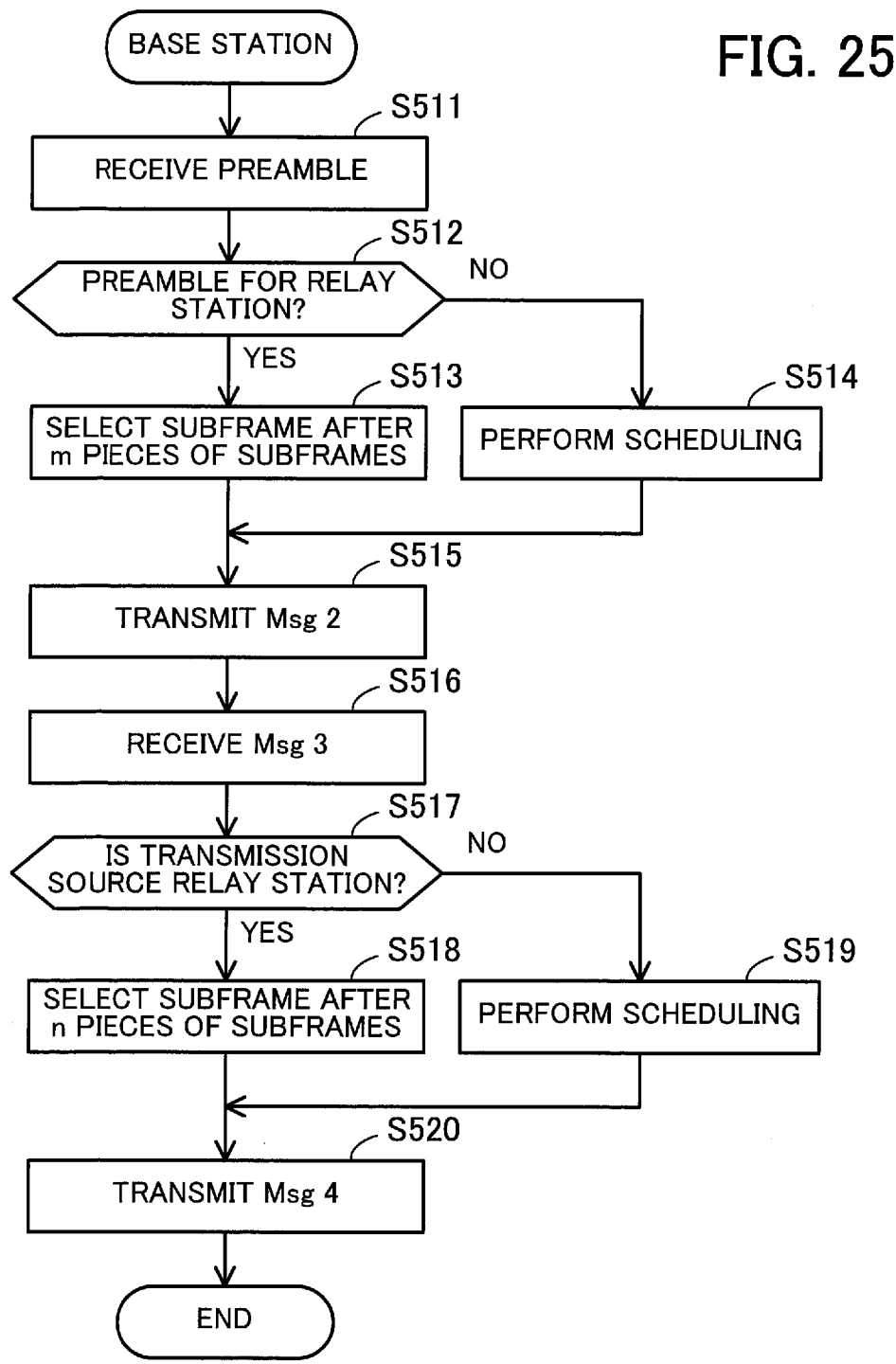
FIG. 25 is a flowchart illustrating a process of a base station according to a sixth embodiment.

FIG. 25 is a flowchart illustrating a process of the base station according to the sixth embodiment. Since processes of steps S511, S512, S514 to S517, S519, and S520 illustrated in FIG. 25 are the same as those of steps S111, S112, S114 to S117, S119, and S120 illustrated in FIG. 9, a description will not be repeated.

(Step S513) The backhaul controller 163 selects a subframe after m pieces of subframes from the subframe in which the Msg 1 is received. A character m indicates a predetermined value of the base station 100 and the relay stations 200 and 200a, and is set, for example, to be equal to three.

(Step S518) The backhaul controller 163 selects a subframe after n pieces of subframes from the subframe in which the Msg 3 is received. A character n indicates a predetermined value of the base station 100 and the relay stations 200 and 200a, and is set, for example, to be equal to eight.

Figure 26:
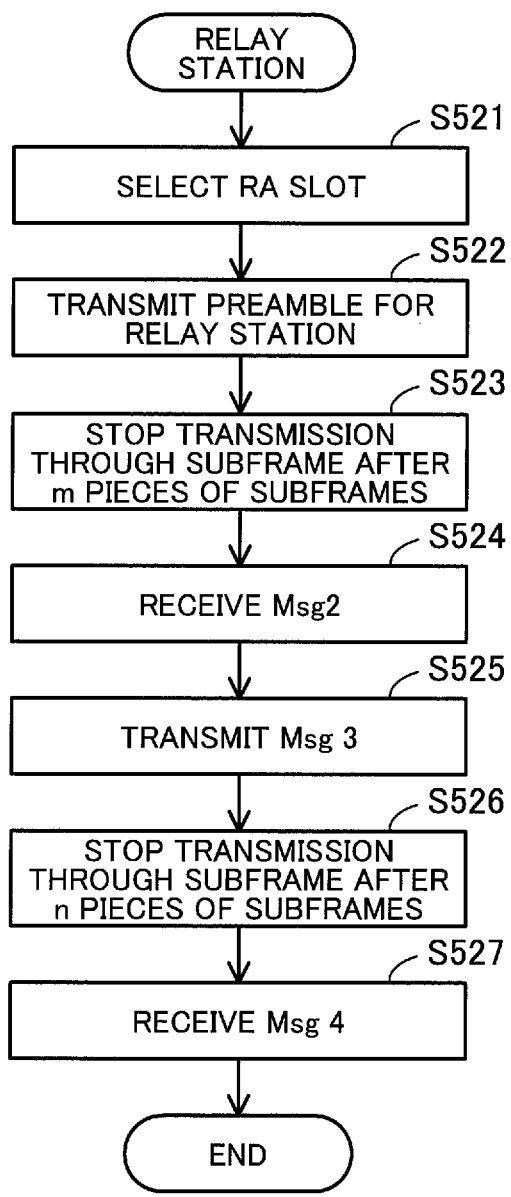
FIG. 26 is a flowchart illustrating a process of a relay station according to a sixth embodiment.

FIG. 26 is a flowchart illustrating a process of the relay station according to the sixth embodiment. Since processes of steps S521, S522, and S525 illustrated in FIG. 26 are the same as those of steps S121, S122, and S125 illustrated in FIG. 10, a description will not be repeated.

(Step S523) The backhaul controller 263 limits transmission of a radio signal (including a reference signal) to the mobile station 300 through a subframe after m pieces of subframes from the subframe in which the Msg 1 is transmitted. When the Msg 2 is transmitted through the PDCCH, the backhaul controller 263 stops transmitting a signal in both of the areas for control and data. When the Msg 2 is transmitted through the R-PDCCH, the backhaul controller 263 stops transmitting a signal at least in the area for data.

(Step S524) The radio communication unit 210 receives the Msg 2 from the base station 100 through the PDCCH or R-PDCCH of a subframe after the m pieces of subframes from the above subframe.

(Step S526) The backhaul controller 263 limits transmission of a radio signal (including a reference signal) to the mobile station 300 through a subframe after n pieces of subframes from the subframe in which the Msg 3 is transmitted. When the Msg 4 is transmitted through the PDCCH, the backhaul controller 263 stops transmitting a signal in both of the areas for control and data. When the Msg 4 is transmitted through the R-PDCCH, the backhaul controller 263 stops transmitting a signal at least in the area for data.

(Step S527) The radio communication unit 210 receives the Msg 4 from the base station 100 through the PDCCH or R-PDCCH of a subframe after the n pieces of subframes from the above subframe.

Figure 27:
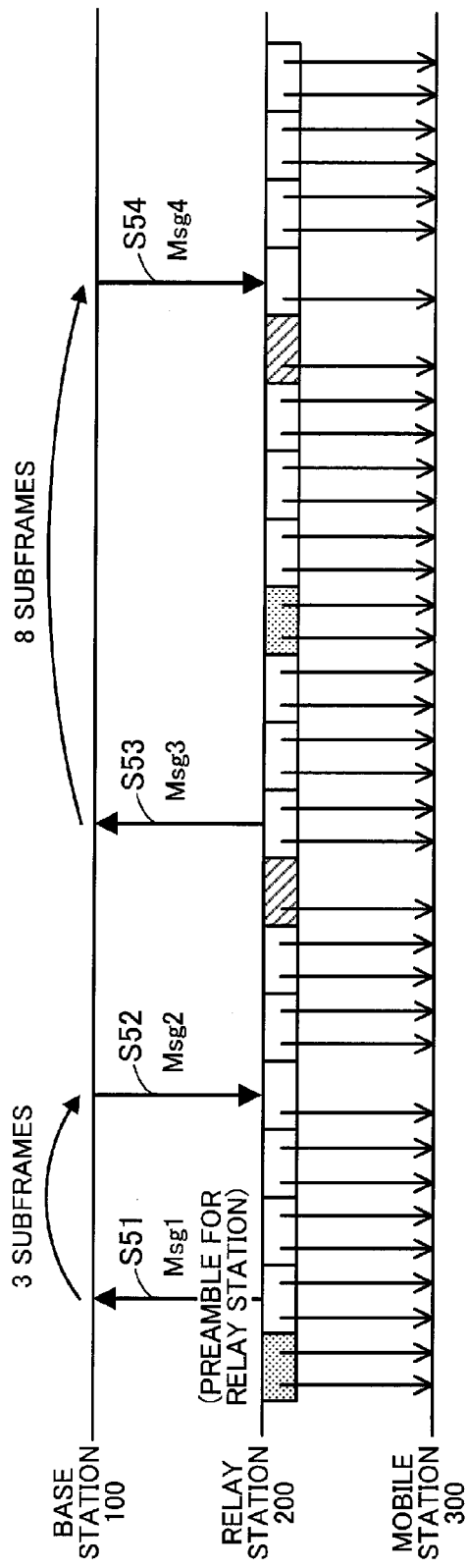
FIG. 27 illustrates a random access example according to a sixth embodiment.

FIG. 27 illustrates a random access example according to the sixth embodiment. The message flow illustrated in FIG. 27 includes the following steps:

(Step S51) The relay station 200 transmits the Msg 1 to the base station 100 by using a preamble for the relay station. Based on the preamble, the base station 100 recognizes that a transmission source of the Msg 1 is the relay station.

(Step S52) The base station 100 transmits the Msg 2 through the R-PDCCH of a subframe after three subframes from the subframe in which the Msg 1 is received. Through a subframe after three subframes of the subframe in which the Msg 1 is transmitted, the relay station 200 controls a signal such as a reference signal not to be transmitted in the area for data, thus receiving the Msg 2.

(Step S53) The relay station 200 transmits the Msg 3 to the base station 100. Based on the identifier included in the Msg 3, the base station 100 recognizes that a transmission source of the Msg 3 is the relay station 200.

(Step S54) Through the R-PDCCH of a subframe after eight subframes from the subframe in which the Msg 3 is received, the base station 100 transmits the Msg 4. Through a subframe after eight subframes from the subframe in which the Msg 3 is transmitted, the relay station 200 controls a signal such as a reference signal not to be transmitted in the area for data, thus receiving the Msg 4.

In the foregoing description, whether a transmission source of the Msg 1 is the relay station is determined by using a method according to the second embodiment; further, may be determined by using a method according to the third embodiment.

In the sixth embodiment, in the same manner as in the second and third embodiments, the proposed radio communication system smoothly performs random access from the relay station 200 to the base station 100. In the sixth embodiment, since an interval between the Msg 1 and Msg 2 as well as the interval between the Msg 3 and Msg 4 is fixed, the radio communication system simplifies control of random access in the relay station 200. On the other hand, about the random access from the mobile station 300*a* to the base station 100, since the intervals are not fixed, the radio communication system secures flexibility of scheduling.

Seventh Embodiment

A seventh embodiment will be described below. Since the seventh embodiment shares some elements with the foregoing second embodiment, the following discussion will focus on their distinctive points, omitting explanations of similar elements. In the foregoing second to sixth embodiments, transmission timing of the Msg 2 or Msg 4 is changed based on the fact that a transmission source of the Msg 1 or Msg 3 is the relay station or mobile station. As compared with the above, in the seventh embodiment, even if the base station does not distinguish that a transmission source is the relay station or the mobile station, the radio communication system performs random access.

A radio communication system according to the seventh embodiment is deployed by using the same apparatus configuration as that of the second embodiment illustrated in FIG. 2. Further, a base station, a relay station, and a mobile station according to the seventh embodiment are deployed by using the same block configurations as those of the second embodiment illustrated in FIGS. 6 to 8. Hereinafter, the seventh embodiment will be described with reference to the same reference numerals as those illustrated in FIGS. 6 to 8.

Figure 28:
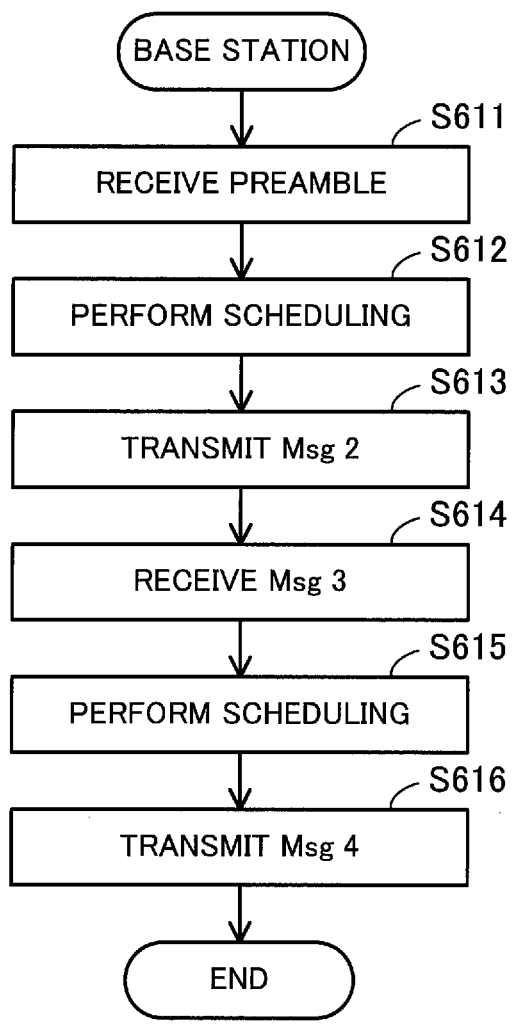
FIG. 28 is a flowchart illustrating a process of a base station according to a seventh embodiment.

FIG. 28 is a flowchart illustrating a process of the base station according to the seventh embodiment. The process illustrated in FIG. 28 includes the following steps:

(Step S611) The radio communication unit 110 receives a preamble (Msg 1) through the PRACH. At this time, a transmission source of the Msg 1 is not concretely identified.

(Step S612) The control plane unit 160 performs scheduling, and selects an arbitrary subframe within the period in which the Msg 2 is transmitted.

(Step S613) The radio communication unit 110 transmits the Msg 2 through the PDCCH or R-PDCCH of the subframe selected at step S612.

(Step S614) The radio communication unit 110 receives the Msg 3. Here, the transmission source is supposed to be the relay station 200.

(Step S615) The control plane unit 160 performs scheduling and selects an arbitrary subframe within the period in which the Msg 4 is transmitted.

(Step S616) The radio communication unit 110 transmits the Msg 4 through the PDCCH or R-PDCCH of the subframe selected at step S615.

Figure 29:
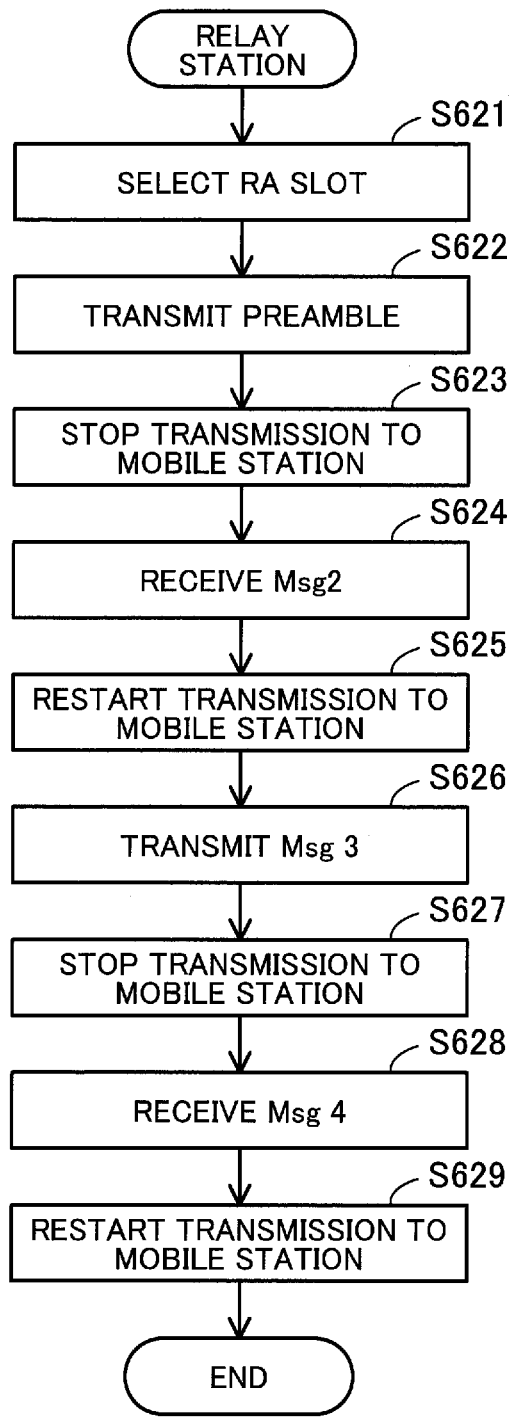
FIG. 29 is a flowchart illustrating a process of a relay station according to a seventh embodiment.

FIG. 29 is a flowchart illustrating a process of the relay station according to the seventh embodiment. The process illustrated in FIG. 29 includes the following steps:

(Step S621) The radio communication unit 210 receives broadcast information from the base station 100 through the PBCH. In the broadcast information, information on the timing of the RA slot is included. The RA transmission management unit 262 selects one RA slot. The backhaul controller 263 controls data not to be received from the mobile station 300 through the subframe on which the RA slot is provided.

(Step S622) The preamble management unit 261 selects one preamble from among candidates of the preambles. The radio communication unit 210 transmits the selected preamble through the RA slot selected at step S621.

(Step S623) The backhaul controller 263 limits transmission of a radio signal (including a reference signal) to the mobile station 300 until receiving the Msg 2 from a head of the period in which the Msg 2 may be received. When the Msg 2 is transmitted through the PDCCH, the backhaul controller 263 stops transmitting a signal in both of the areas for control and data. When the Msg 2 is transmitted through the R-PDCCH, the backhaul controller 263 stops transmitting a signal at least in the area for data.

(Step S624) The radio communication unit 210 receives the Msg 2 from the base station 100 through the PDCCH or R-PDCCH.

(Step S625) The backhaul controller 263 restarts transmission of a radio signal (including a reference signal) to the mobile station 300.

(Step S626) The radio communication unit 210 transmits the Msg 3 to the base station 100.

(Step S627) The backhaul controller 263 limits transmission of a radio signal (including a reference signal) to the mobile station 300 until receiving the Msg 4 from a head of the period in which the Msg 4 may be received. When the Msg 2 is transmitted through the PDCCH, the backhaul controller 263 stops transmitting a signal in both of the areas for control and data. When the Msg 2 is transmitted through the R-PDCCH, the backhaul controller 263 stops transmitting a signal at least in the area for data.

(Step S628) The radio communication unit 210 receives the Msg 2 from the base station 100 through the PDCCH or R-PDCCH.

(Step S629) The backhaul controller 263 restarts transmission of a radio signal (including a reference signal) to the mobile station 300.

FIG. 30 illustrates a random access example according to the seventh embodiment. The message flow illustrated in FIG. 30 includes the following steps:

(Step S61) The relay station 200 transmits the Msg 1 to the base station 100.

(Step S62) The base station 100 performs scheduling, and transmits the Msg 2 through the R-PDCCH of any subframe within the period in which the Msg 2 is transmitted. Through a subframe after three subframes or later from the subframe in which the Msg 1 is transmitted, the relay station 200 controls a signal such as a reference signal not to be transmitted in the area for data, thus receiving the Msg 2.

(Step S63) The relay station 200 transmits the Msg 3 to the base station 100. Based on the identifier included in the Msg 3, the base station 100 recognizes that a transmission source of the Msg 3 is the relay station 200.

(Step S64) The base station 100 performs scheduling, and transmits the Msg 4 through the R-PDCCH of any subframe within the period in which the Msg 4 is transmitted. Through the subframe or later in which the Msg 3 is transmitted, the relay station 200 controls a signal such as a reference signal not to be transmitted in the area for data, thus receiving the Msg 4.

In the seventh embodiment, the proposed radio communication system suppresses self-interference of the relay station 200 and smoothly performs random access from the relay station 200 to the base station 100. Further, the base station 100 does not distinguish random access through the relay station 200 and random access through the mobile station 300a, and therefore preferably performs a common procedure. As a result, the radio communication system simplifies control of the random access.

According to the above-described radio communication system, base station, relay station, and radio communication method, random access through the relay station is smoothly performed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A relay station which performs radio communications with a base station and a mobile station, the relay station comprising:
   a receiver configured to receive radio signals from the base station in downlink backhaul subframes, and to limit reception of radio signals from the base station in subframes other than the downlink backhaul subframes; and
   a controller configured to allow, when performing a random access to the base station, the receiver to receive a message of the random access even in the subframes other than the downlink backhaul subframes.

2. A radio communication system comprising:
   a base station;
   a mobile station; and
   a relay station which performs radio communications with the base station and the mobile station, the relay station including:
      a receiver configured to receive radio signals from the base station in downlink backhaul subframes, and to limit reception of radio signals from the base station in subframes other than the downlink backhaul subframes; and
      a controller configured to allow, when performing a random access to the base station, the receiver to receive a message of the random access even in the subframes other than the downlink backhaul subframes.

* * * * *